(12) United States Patent
Ikuta

(10) Patent No.: US 8,794,780 B2
(45) Date of Patent: Aug. 5, 2014

(54) LIGHTING DEVICE WITH LIGHT-SCATTERING OPTICAL MEMBER

(75) Inventor: Kaori Ikuta, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 472 days.

(21) Appl. No.: 13/145,347

(22) PCT Filed: Oct. 9, 2009

(86) PCT No.: PCT/JP2009/067612
§ 371 (c)(1),
(2), (4) Date: Jul. 20, 2011

(87) PCT Pub. No.: WO2010/084649
PCT Pub. Date: Jul. 29, 2010

(65) Prior Publication Data
US 2011/0285922 A1 Nov. 24, 2011

(30) Foreign Application Priority Data
Jan. 23, 2009 (JP) ................. 2009-013298

(51) Int. Cl.
*G09F 13/08* (2006.01)

(52) U.S. Cl.
USPC ............ 362/97.4; 362/223; 362/311.01; 362/327; 362/330; 362/333; 349/68

(58) Field of Classification Search
USPC ............ 362/97.2, 339, 97.4, 222, 223, 224, 362/217.02, 311.01, 311.14, 311.15, 326, 362/327, 330, 331, 333; 349/68
See application file for complete search history.

(56) References Cited

U.S. PATENT DOCUMENTS

| | | | | |
|---|---|---|---|---|
| 4,803,399 A | * | 2/1989 | Ogawa et al. | 349/70 |
| 4,936,659 A | * | 6/1990 | Anderson et al. | 349/64 |
| 5,029,986 A | * | 7/1991 | De Vaan | 349/64 |
| 6,633,351 B2 | * | 10/2003 | Hira et al. | 349/62 |
| 7,327,416 B2 | * | 2/2008 | Lee et al. | 349/65 |
| 7,396,150 B2 | * | 7/2008 | Ogawa et al. | 362/607 |
| 7,553,059 B2 | * | 6/2009 | Kuroda et al. | 362/607 |
| 7,628,502 B2 | * | 12/2009 | Kodama et al. | 362/97.1 |
| 7,847,881 B2 | * | 12/2010 | Ha et al. | 349/64 |

(Continued)

FOREIGN PATENT DOCUMENTS

| | | |
|---|---|---|
| CN | 1678047 A | 10/2005 |
| CN | 1860405 A | 11/2006 |

(Continued)

OTHER PUBLICATIONS

Official Communication issued in International Patent Application No. PCT/JP2009/067612, mailed on Jan. 19, 2010.

*Primary Examiner* — Ismael Negron
(74) *Attorney, Agent, or Firm* — Keating & Bennett, LLP

(57) ABSTRACT

A backlight device 12 includes cold cathode tubes 17, a chassis that houses the cold cathode tubes 17 therein and having an opening 14b through which light emitted from the cold cathode tubes exits, and a diffuser plate 15 provided so as to face the cold cathode tubes 17 and cover the opening 14b. A light reflecting portion 30 is formed on a side of the diffuser plate 15 close to the cold cathode tubes 17 so as to have different light reflectance in every surface area of a surface of the diffuser plate 15. A scattering structure 31 is formed on a side of the diffuser plate 15 opposite from the cold cathode tubes 17 and scatters the light.

15 Claims, 33 Drawing Sheets

(56) References Cited

U.S. PATENT DOCUMENTS

| | | | |
|---|---|---|---|
| 7,990,490 B2 * | 8/2011 | Lee et al. | 349/62 |
| 8,040,461 B2 * | 10/2011 | Lin et al. | 349/64 |
| 8,111,353 B2 * | 2/2012 | Ogasawara et al. | 349/64 |
| 8,310,624 B2 * | 11/2012 | Shiau et al. | 349/64 |
| 2005/0219423 A1 | 10/2005 | Kamise et al. | |
| 2006/0268568 A1 | 11/2006 | Oku et al. | |
| 2008/0239202 A1 | 10/2008 | Won et al. | |
| 2008/0316770 A1 | 12/2008 | Oku et al. | |

FOREIGN PATENT DOCUMENTS

| | | |
|---|---|---|
| CN | 201017139 Y | 2/2008 |
| CN | 101276098 A | 10/2008 |
| JP | 02-069318 U | 5/1990 |
| JP | 2007-256575 A | 10/2007 |

\* cited by examiner

FIG.1
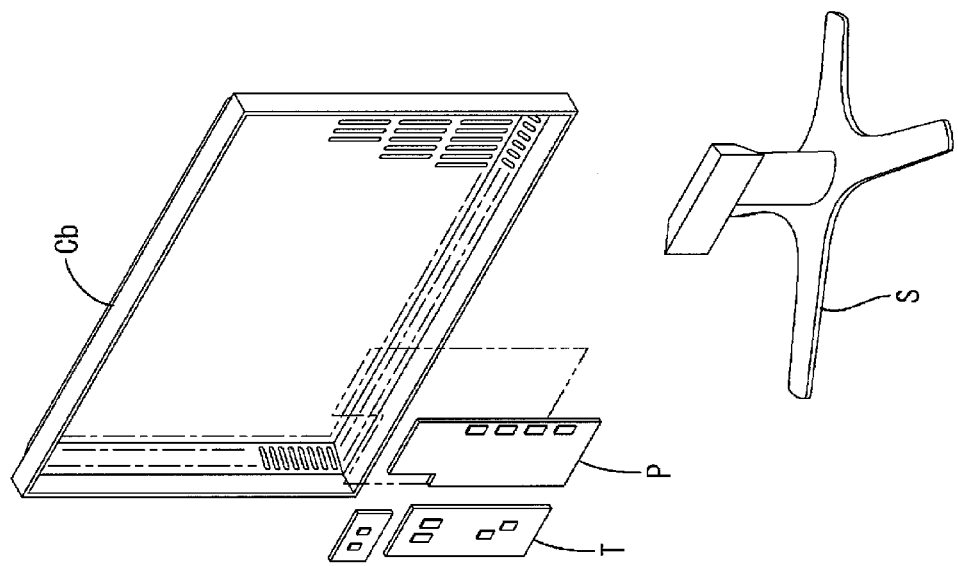
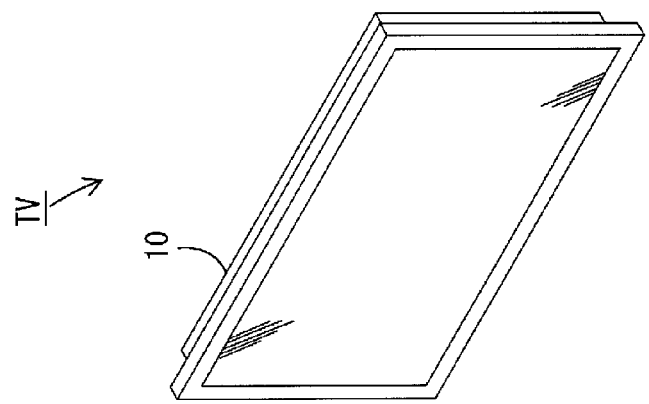
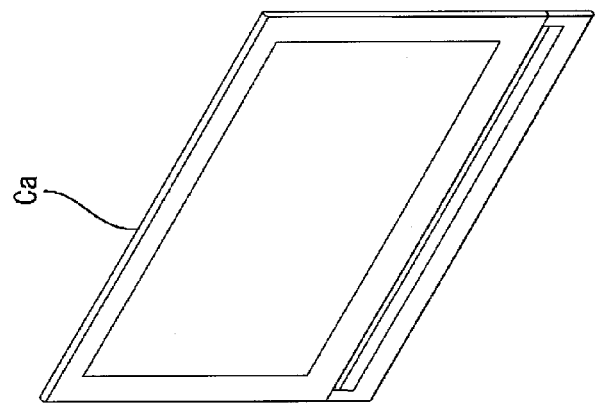

LIGHTING DEVICE WITH LIGHT-SCATTERING OPTICAL MEMBER

TECHNICAL FIELD

The present invention relates to a lighting device, a display device and a television receiver.

BACKGROUND ART

A liquid crystal panel included in a liquid crystal display device does not emit light, and thus a backlight device is required as a separate lighting device. The backlight device is arranged behind the liquid crystal panel (i.e., on a side opposite from a display surface side). It includes a chassis having an opening on a liquid crystal panel side, a plurality of fluorescent tubes housed in the chassis as a lamp, and an optical member (such as a diffuser plate) that is provided in the opening of the chassis and effectively discharges light emitted from the fluorescent tubes to the liquid crystal panel side.

In such a backlight device where the fluorescent tubes emit linear light, a plurality of fluorescent tubes are aligned with each other and the optical member converts linear light into planer light to unify illumination light. However, if the linear light is not sufficiently converted into the planer light, striped lamp images are generated along the alignment of the fluorescent tubes, and this deteriorates display quality of the liquid crystal display device.

To obtain uniform illumination light from the backlight device, it is desirable to increase the number of lamps and reduce a distance between the adjacent lamps or to increase a diffusion rate of a diffuser plate, for example. However, increase of the number of lamps increases a cost of the backlight device and also increases power consumption. Increase of the diffusion rate of the diffuser plate fails to improve brightness and causes the problem that the number of lamps is required to be increased. A backlight device disclosed in Patent Document 1 has been known as one that suppresses power consumption and ensures uniform brightness.

The backlight device described in Patent Document 1 includes a light source emitting rays of light, a light guide reflecting the rays of light to a liquid crystal display side, light blocking means provided between the light source and the liquid crystal display and on a portion directly above the light source, and a diffuser plate diffusing the rays of entering light to obtain uniform diffused light. The light blocking means blocks a part of the rays of light emitted from the light source.
[Patent Document 1] Japanese Unexamined Utility Model Publication No. 2-69318

Problem to be Solved by the Invention

However, in such a lighting device, the light blocking means controls light entrance efficiency for every surface region of a surface of the diffuser plate. Also in such a lighting device, a light exit surface of the diffuser plate is substantially a smooth surface and the illumination light exited to the liquid crystal panel has directivity influenced by the light blocking means. Therefore, viewing angle dependency of brightness is caused on the light exit surface of the diffuser plate and this may cause uneven brightness. When viewing the light exit surface of the diffuser plate from an oblique side, the shape of the light blocking means may be recognized as uneven brightness via the diffuser plate.

To cope with such a problem, a number of optical sheets such as diffuser sheets may be provided on the diffuser plate. However, this increases the number of optical members or the number of components. This may be disadvantage in a cost for preparing components or the number of assembling processes and this increases a cost.

DISCLOSURE OF THE PRESENT INVENTION

The present invention was made in view of the foregoing circumstances. An object of the present invention is to restrict uneven brightness from being caused with a low cost.

Means for Solving the Problem

To solve the above problem, a lighting device of the present invention includes a light source, a chassis configured to house the light source therein and having an opening through which light emitted from the light source exits, an optical member provided so as to face the light source and cover the opening and having a surface including surface areas, a light reflecting portion provided on a side of the optical member close to the light source and configured to have different light reflectance in each of the surface areas, and a scattering structure formed on a side of the optical member opposite from the light source and configured to scatter the light.

With this configuration, rays of light emitted from the light source enters the optical member with the entrance efficiency being controlled for every surface area by the light reflecting portion that has different light reflectance for every surface area. When the rays of light entering the optical member exit from a side of the optical member opposite from the light source, the rays of light are scattered by the scattering structure. Therefore, the exiting illumination light is less likely to have directivity that is influenced by the light reflecting portion and the viewing angle dependency of brightness is less likely to occur. The scattering structure is formed on the optical member and this reduces the number of components compared to the case in that another optical sheet is provided on the optical member instead of the scattering structure.

BRIEF DESCRIPTION OF THE DRAWINGS

FIG. 1 is an exploded perspective view illustrating a general construction of a television receiver according to a first embodiment of the present invention;

BEST MODE FOR CARRYING OUT THE INVENTION

First Embodiment

The first embodiment of the present invention will be explained with reference to FIGS. 1 to 9.

First, a construction of a television receiver TV including a liquid crystal display device 10 will be explained.

Figure 2:
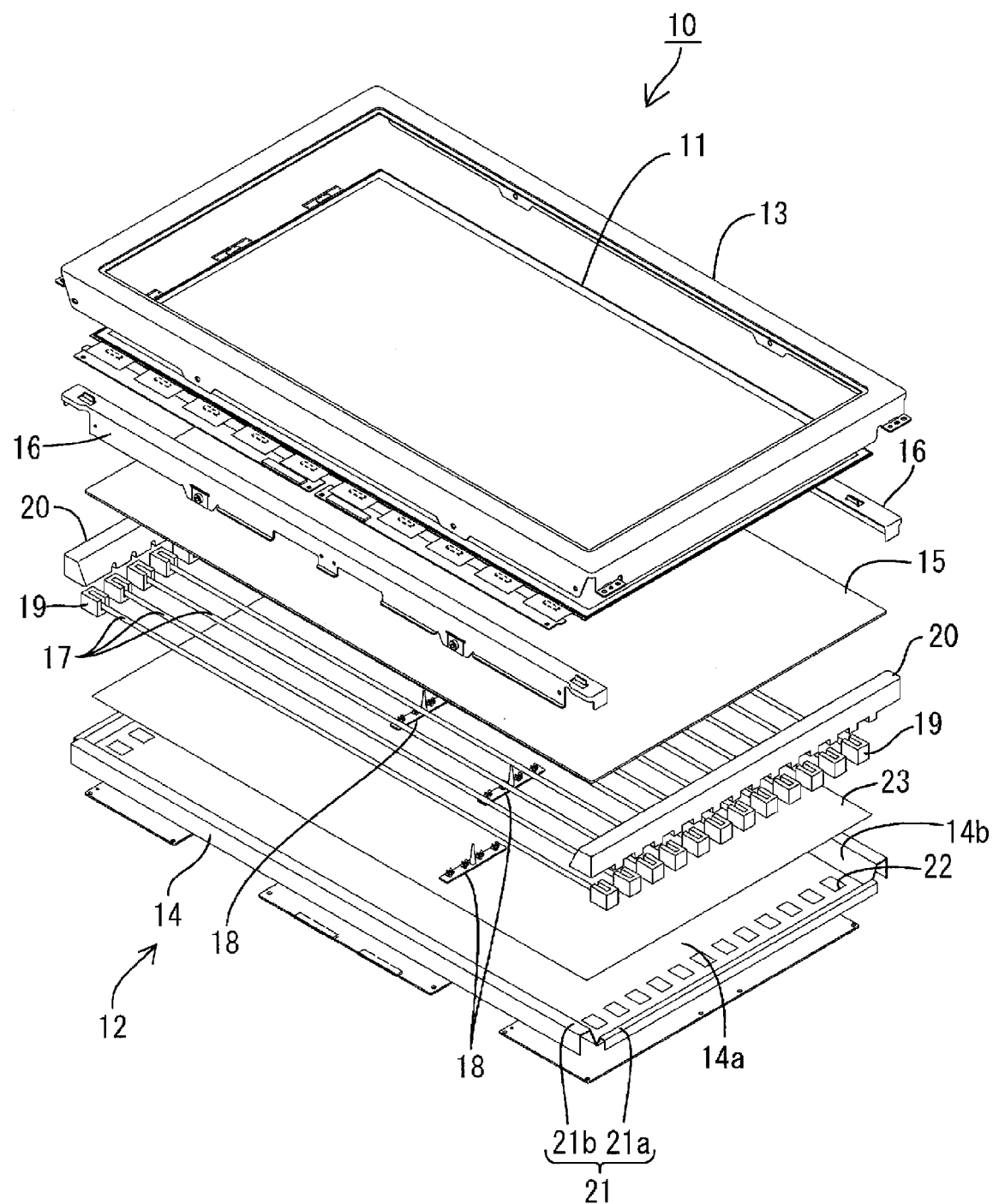
FIG. 2 is an exploded perspective view illustrating a general construction of a liquid crystal display device provided in the television receiver.
Figure 3:
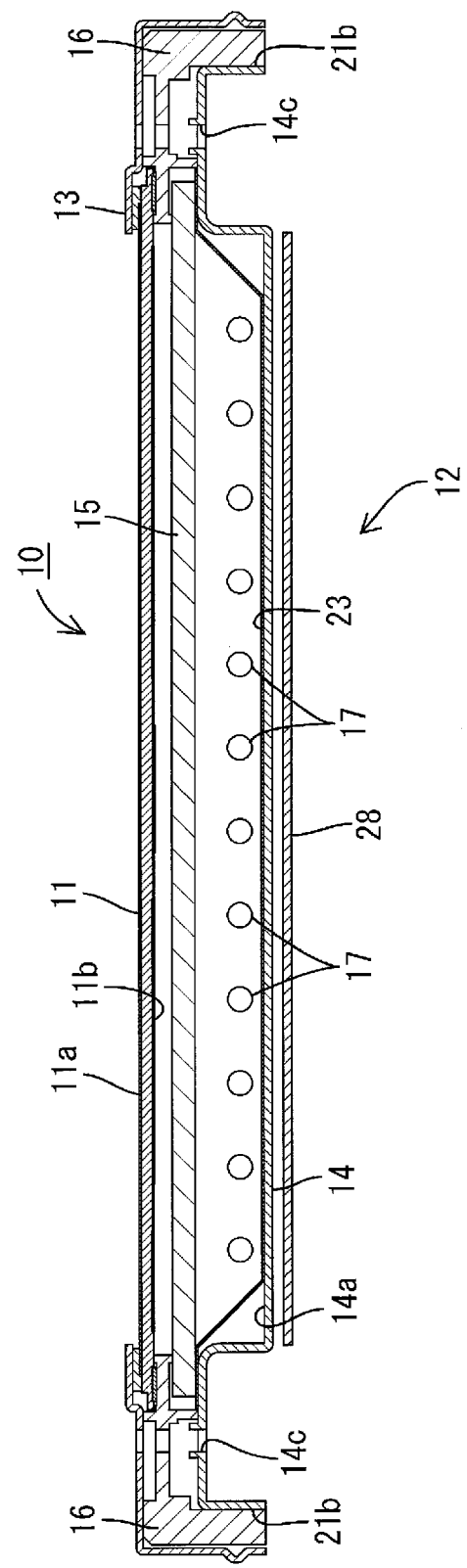
FIG. 3 is a cross-sectional view of the liquid crystal display device along the short-side direction.
Figure 4:
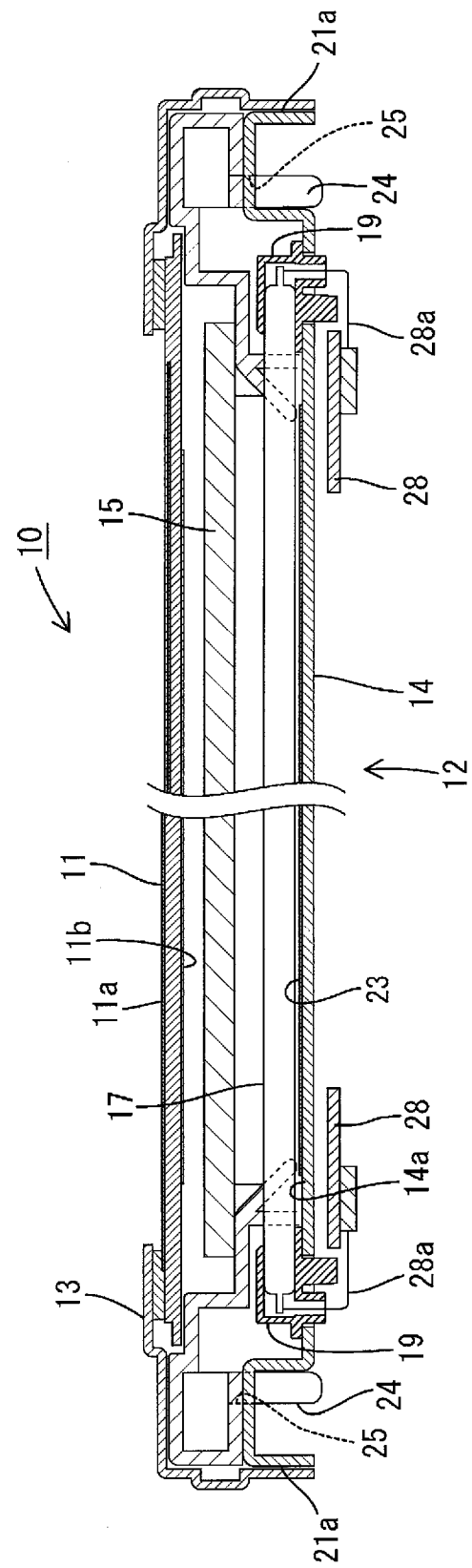
FIG. 4 is a cross-sectional view of the liquid crystal display device along the long-side direction.
Figure 5:
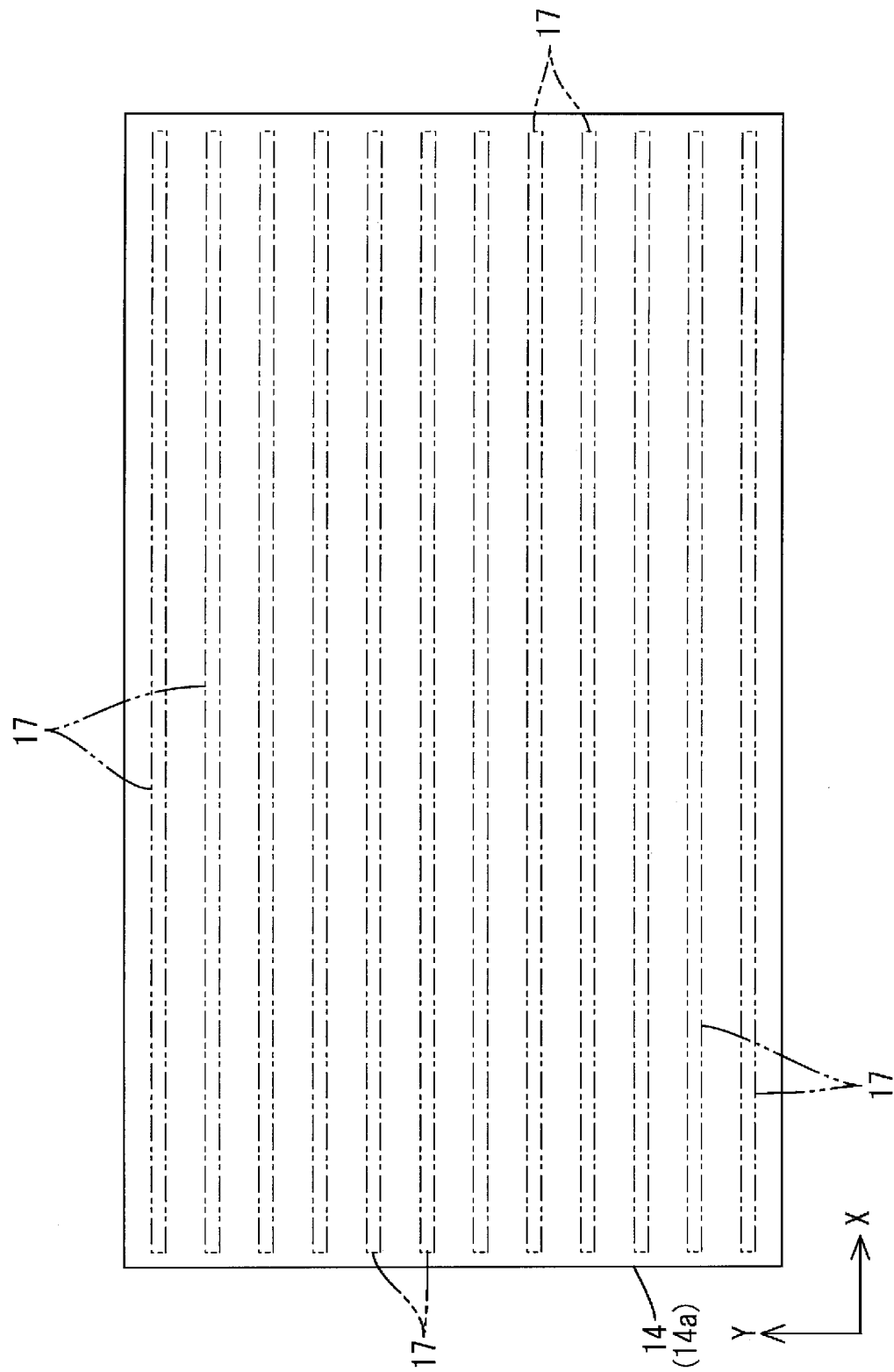
FIG. 5 is a plan view illustrating an arrangement of cold cathode tubes and a chassis provided in the liquid crystal display device.

FIG. 1 is an exploded perspective view illustrating a general construction of the television receiver of this embodiment. FIG. 2 is an exploded perspective view illustrating a general construction of the liquid crystal display device included in the television receiver in FIG. 1. FIG. 3 is a cross-sectional view of the liquid crystal display device in FIG. 2 along the short-side direction. FIG. 4 is a cross-sectional view of the liquid crystal display device in FIG. 2 along the long-side direction. FIG. 5 is a plan view illustrating an arrangement of cold cathode tubes and a chassis provided in the liquid crystal display device in FIG. 2. In FIG. 5, the long-side direction of the chassis corresponds to an X-axis direction and the short-side direction corresponds to a Y-axis direction.

As illustrated in FIG. 1, the television receiver TV of the present embodiment includes the liquid crystal display device 10, front and rear cabinets Ca, Cb that house the liquid crystal display device 10 therebetween, a power source P, a tuner T and a stand S. An overall shape of the liquid crystal display device (display device) 10 is a landscape rectangular. The liquid crystal display device 10 is housed in a vertical position such that a short-side direction thereof matches a vertical line. As illustrated in FIG. 2, it includes a liquid crystal panel 11 as a display panel, and a backlight device 12 (lighting device), which is an external light source. They are integrally held by a bezel 13 and the like.

Next, the liquid crystal panel 11 and the backlight device 12 included in the liquid crystal display device 10 will be explained (see FIGS. 2 to 4).

The liquid crystal panel (display panel) 11 is constructed such that a pair of glass substrates is bonded together with a predetermined gap therebetween and liquid crystal is sealed between the glass substrates. On one of the glass substrates, switching components (e.g., TFTs) connected to source lines and gate lines that are perpendicular to each other, pixel electrodes connected to the switching components, and an alignment film are provided. On the other substrate, a color filter having color sections such as R (red), G (green) and B (blue) color sections arranged in a predetermined pattern, counter electrodes, and an alignment film are provided. Polarizing plates 11a, 11b are attached to outer surfaces of the substrates (see FIGS. 3 and 4).

As illustrated in FIG. 2, the backlight device 12 includes a chassis 14, a diffuser plate (an optical member, a light diffusing member) 15 provided to cover the opening 14b of the chassis 14, and frames 16. The chassis 14 has a substantially box-shape and an opening 14b on the light output side (on the liquid crystal panel 11 side). The frames 16 arranged along the long sides of the chassis 14 holds the long-side edges of the diffuser plate 15 to the chassis 14. The long-side edges of the diffuser plate 15a are sandwiched between the chassis 14 and the frames 16. Cold cathode tubes (light sources) 17, lamp clips 18, relay connectors 19 and lamp holders 20 are installed in the chassis 14. The lamp clips 18 are provided for mounting the cold cathode tube 17 to the chassis 14. The relay connectors 19 are connected to ends of the cold cathode tubes 17 for making electrical connection. The lamp holders 20 collectively cover ends of the cold cathode tubes 17 and the relay connectors 19. A light output side of the backlight device 12 is a side closer to the diffuser plate 15a than the cold cathode tubes 17.

The chassis 14 is prepared by processing a metal plate. The chassis 14 is formed in a substantially shallow box shape. It includes a rectangular bottom plate 14a and outer rims 21, each of which extends upright from the corresponding side of the bottom plate 14a and has a substantially U shape. The outer rims 21 include short-side outer rims 21a and long-side outer rims 21b provided at the short sides and the long sides of the chassis 14, respectively. The bottom plate 14a has a plurality of mounting holes 22 along the long-side edges thereof. The relay connectors 19 are mounted in the mounting holes 22. As illustrated in FIG. 3, fixing holes 14c are provided on the upper surface of the chassis 14 along the long-side outer rims 21b to bind the bezel 13, the frames 16 and the chassis 14 together with screws and the like.

A light reflecting sheet 23 is disposed on an inner surface of the bottom plate 14a of the chassis 14 (on a side that faces the cold cathode tubes 17). The light reflecting sheet 23 is a synthetic resin sheet having a surface in white color that provides high light reflectivity. It is placed so as to cover almost entire inner surface of the bottom plate 14a of the chassis 14. As illustrated in FIG. 3, long-side edges of the light reflecting sheet 23 are lifted so as to cover the long-side outer rims 21b of the chassis 14 and sandwiched between the chassis 14 and the diffuser plate 15. With this light reflecting sheet 23, light emitted from the cold cathode tubes 17 is reflected to the diffuser plate 15.

Each cold cathode tube 17 has an elongated tubular shape. A plurality of the cold cathode tubes 17 (twelve in FIG. 5) are installed in the chassis 14 so as to be parallel to each other. Specifically, the cold cathode tubes 17 are arranged such that they are arranged parallel to each other with the long-side direction (axial direction) thereof aligned along the long-side direction of the chassis 14 and at predetermined arrangement intervals in the short-side direction of the chassis 14. The cold cathode tubes 17 are arranged evenly on an entire surface (an entire area) of the bottom plate 14a of the chassis 14. The arrangement intervals of the cold cathode tubes 17 are substantially equal to each other. The cold cathode tubes 17 are held by the lamp clips 18 (not illustrated in FIGS. 3 and 4) so as to be supported with a small gap between the cold cathode tubes 17 and the bottom plate 14a of the chassis 14 (reflecting sheet 23) (see FIG. 4).

The holders 20 that cover the ends of the cold cathode tubes 17 and the relay connectors 19 are made of white synthetic resin. Each of them has an elongated substantially box shape that extends along the short side of the chassis 14 as illustrated in FIG. 2. As illustrated in FIG. 4, each holder 20 has steps on the front side such that the diffuser plate 15 and the liquid crystal panel 11 are held at different levels. A part of the holder 20 is placed on top of a part of the corresponding short-side outer rim 21a of the chassis 14 and forms a side wall of the backlight device 12 together with the short-side outer rim 21a. An insertion pin 24 projects from a surface of the holder 20 that faces the outer rim 21a of the chassis 14. The holder 20 is mounted to the chassis 14 by inserting the insertion pin 24 into the insertion hole 25 provided in the top surface of the short-side outer rim 21a of the chassis 14.

On the outer surface of the bottom plate 14a of the chassis 14 (on a side opposite from the cold cathode tubes 17), as illustrated in FIGS. 3 and 4, the inverter board set (light source driving board) 28 is provided so as to overlap ends of the cold cathode tubes 17. Accordingly, drive power is supplied from the inverter board set 28 to the cold cathode tubes 17. Each end of each cold cathode tube 17 has a terminal (not shown) for receiving drive power and electrical connection between the terminal and a harness 28a (see FIG. 4) derived from the inverter board set 28 enables supply of high-voltage drive power. Such electrical connection is established in a relay connector 19 in which the end of the cold cathode tube 17 is fitted. The holders 20 are mounted so as to cover the relay connectors 19.

On the opening 14b side of the chassis 14, the diffuser plate 15 is provided. The diffuser plate 15 converts linear light emitted from the cold cathode tubes 17 into planer light to illuminate the liquid crystal panel 11 with the planer light. The short-side edges of the diffuser plate 15 are placed on the first surface 20a of the holder 20 as described above, and does not receive a vertical force. As illustrated in FIG. 3, the long-side edges of the diffuser plate 15 are sandwiched between the chassis 14 (the reflecting sheet 23) and the frame 16. Accordingly, the diffuser plate 15 covers the opening 14b of the chassis 14.

In this embodiment, sizes of the cold cathode tubes 17 and their arrangements are defined as follows. The diameter of each cold cathode tube 17 used in this embodiment is 4.0 mm. The distance between the cold cathode tubes 17 and the light reflecting sheet 23 is 0.8 mm. The distance between the adjacent cold cathode tubes 17 is 16.4 mm. The distance between the cold cathode tubes 17 and the diffuser plate 15 is 2.7 mm. In this backlight device 12, distances between the components are defined so as to reduce the thickness of the backlight device 12. Especially, the distance between the cold cathode tubes 17 and the diffuser plate 15 and the distance between the cold cathode tubes 17 and the reflecting sheet 23 are reduced. Because of the thickness reduction of the lighting device 12, the liquid crystal display device 10 and that of the television receiver TV are provided with the following thicknesses. The thickness of the liquid crystal display device 10 (i.e., the thickness between the front surface of the liquid crystal panel 11 and the back surface of the backlight device 12) is 16 mm. The thickness of the television receiver TV (i.e., and the thickness between the front surface of the front cabinet Ca and the back surface of the rear cabinet Cb) is 34 mm. Namely, a thin television receiver is provided.

A configuration of the diffuser plate 15 will be explained with reference to FIGS. 6 to 9.

Figure 6:
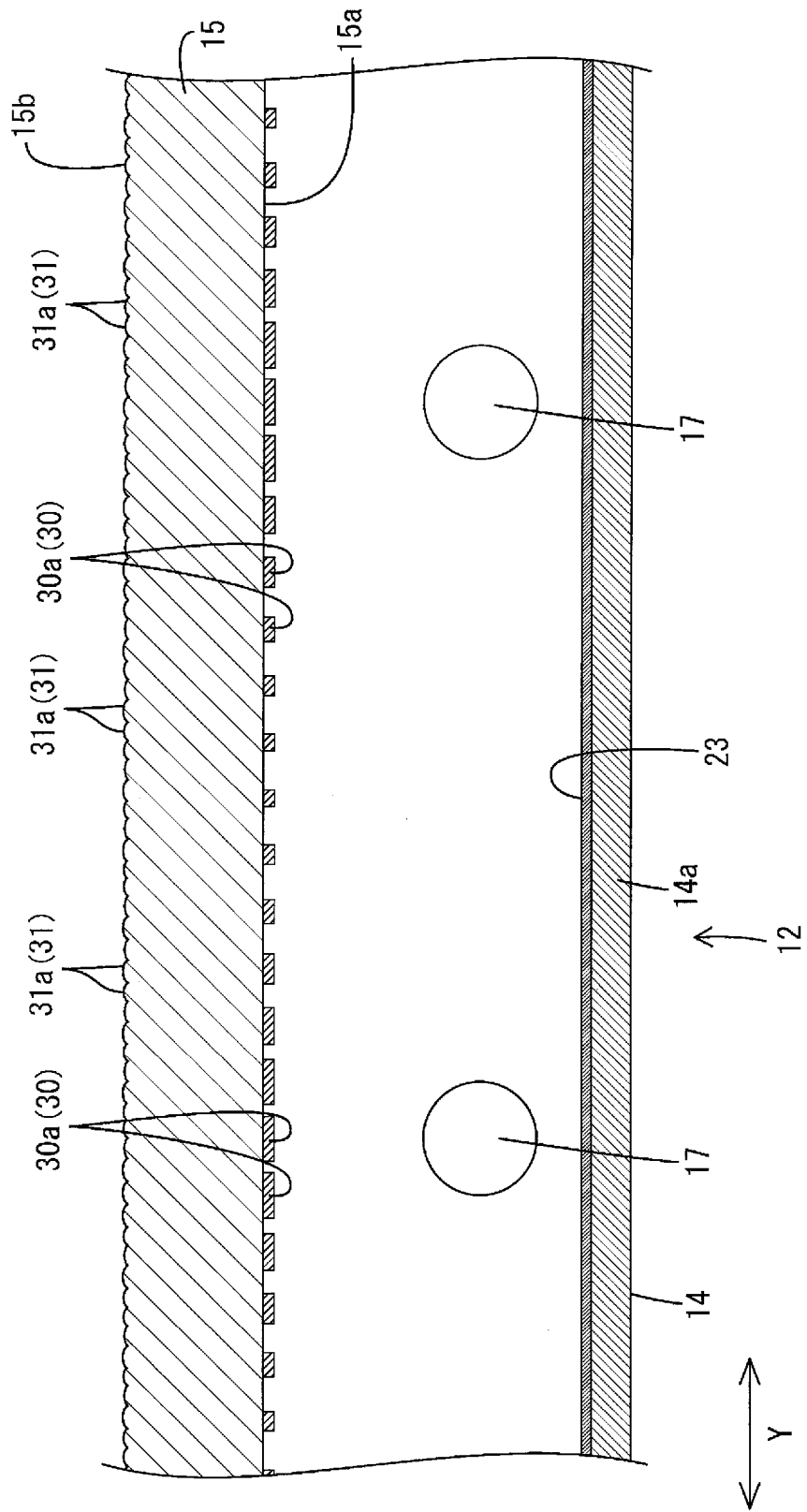
FIG. 6 is a partially-enlarged plan view illustrating a detailed construction of the diffuser plate.
Figure 7:
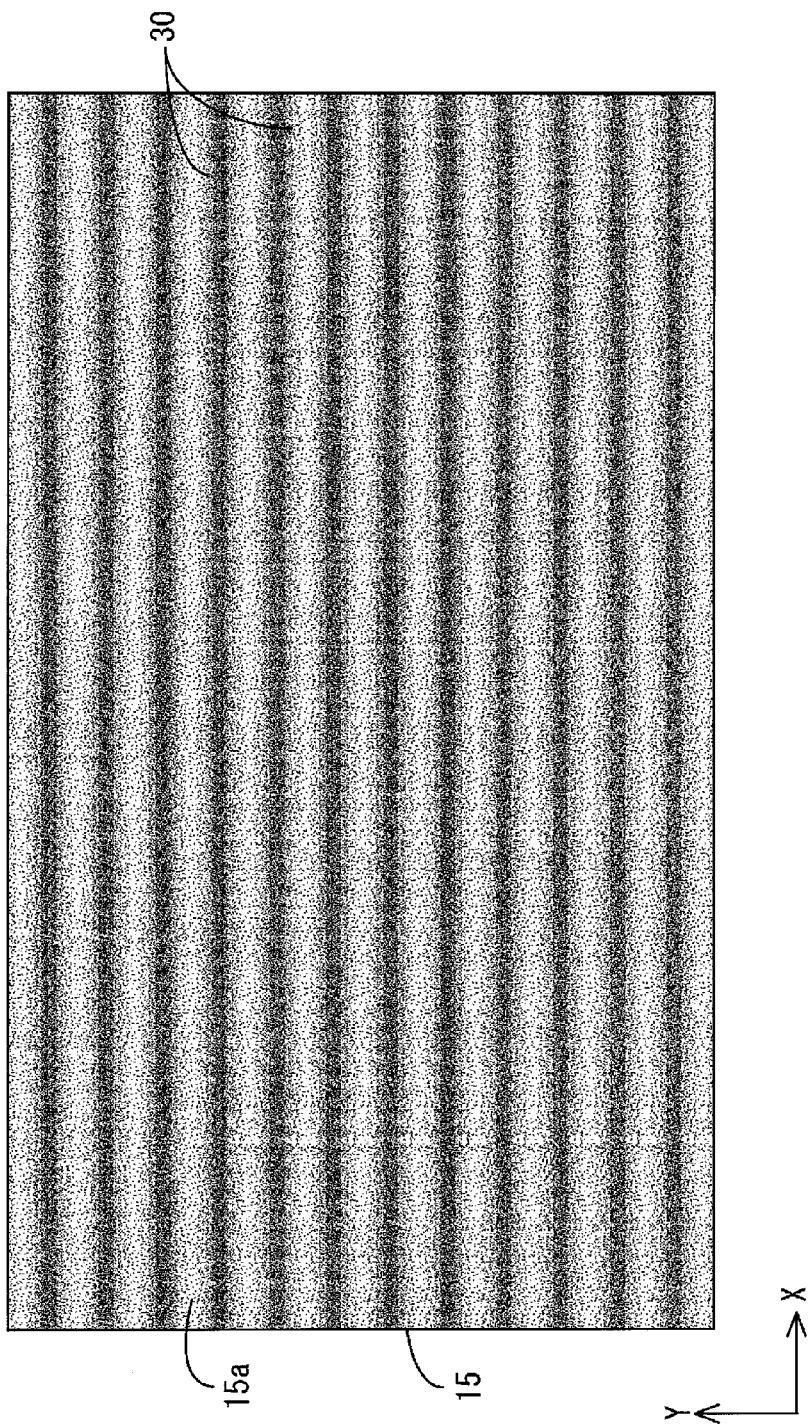
FIG. 7 is a plan view explaining a light reflectance distribution on a surface of the diffuser plate.
Figure 8:
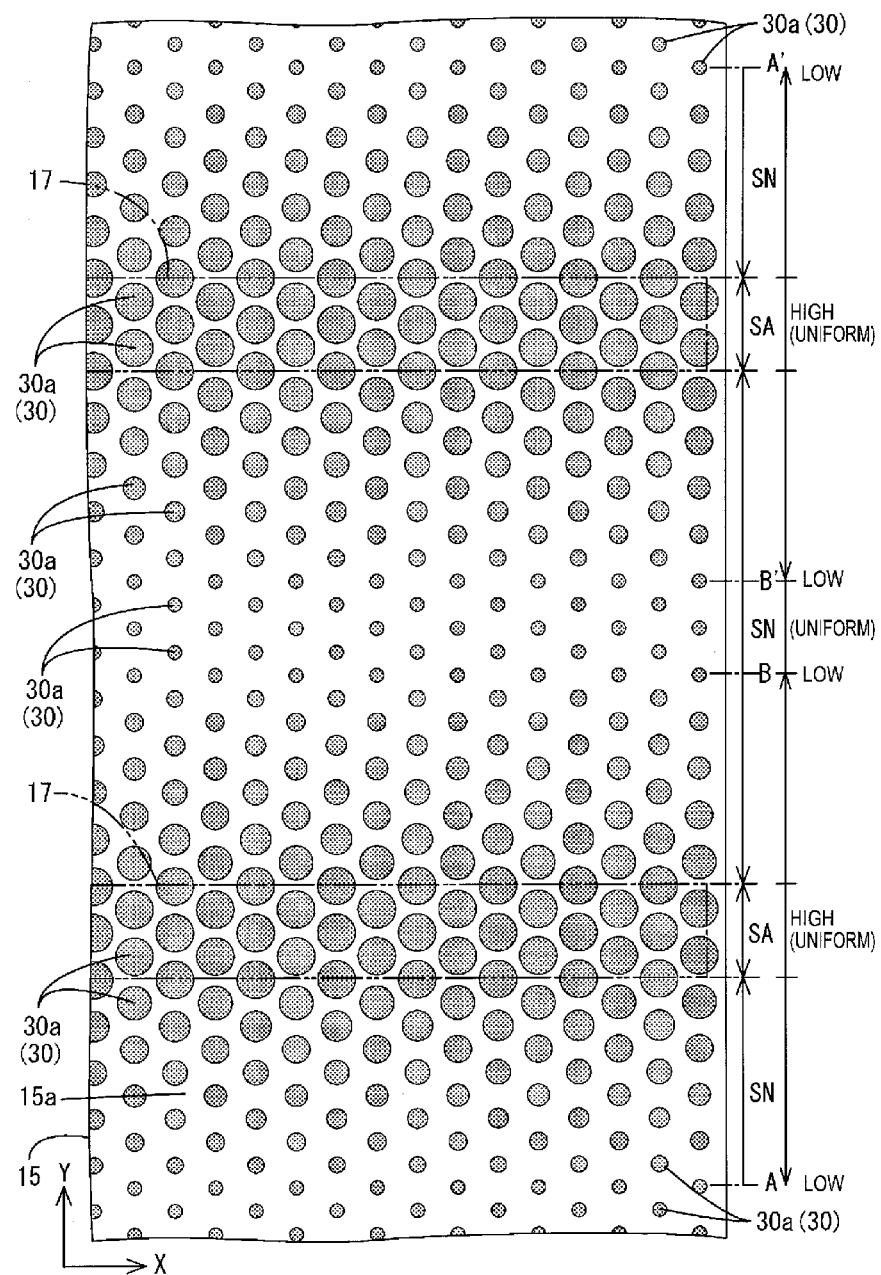
FIG. 8 is a partially-enlarged plan view illustrating a general construction of a surface of the diffuser plate facing the cold cathode tubes.
Figure 9:
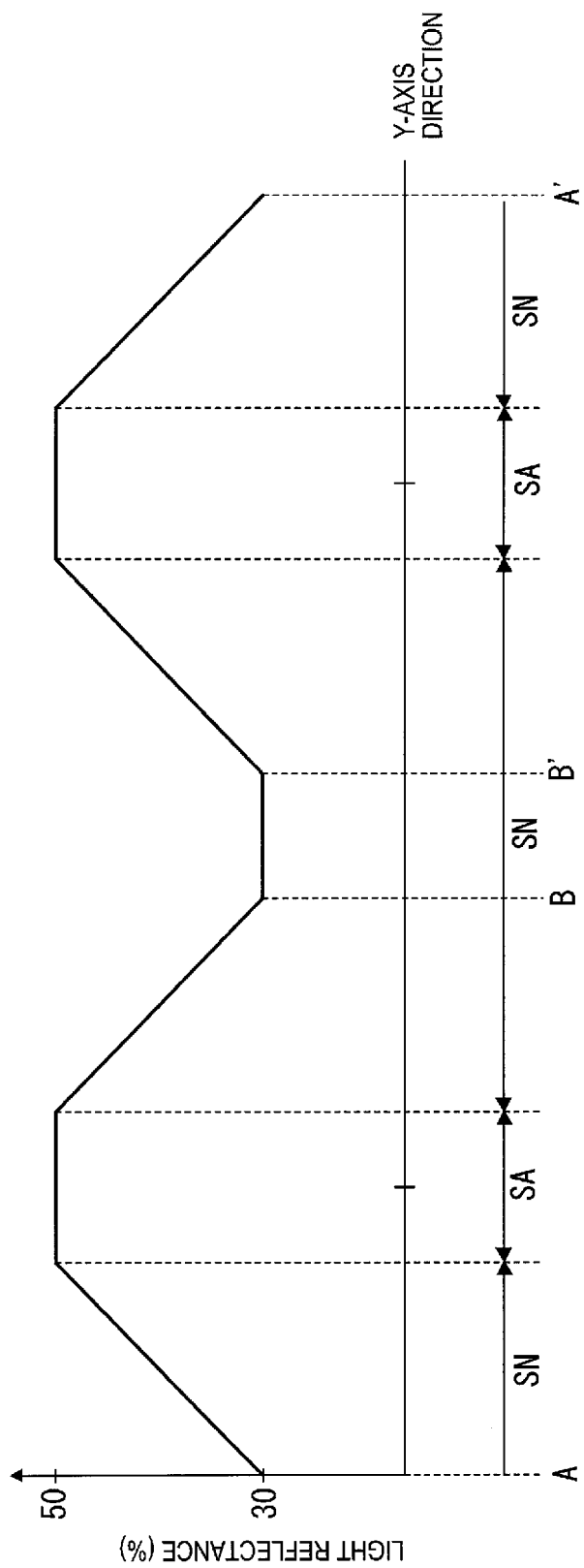
FIG. 9 is a graph illustrating a light reflectance change in the short-side direction of the diffuser plate.

FIG. 6 is a partially-enlarged plan view illustrating a specific construction of the diffuser plate. FIG. 7 is a plan view explaining a light reflectance distribution on a surface of the diffuser plate in FIG. 6. FIG. 8 is a partially-enlarged plan view illustrating a general construction of a surface of the diffuser plate facing the cold cathode tubes in FIG. 6. FIG. 9 is a graph illustrating a light reflectance change in the short-side direction of the diffuser plate in FIG. 6. In FIGS. 6 to 8, the long-side direction of the diffuser plate is referred to as an X-axis direction and the short-side direction thereof is referred to as a Y-axis direction. In FIG. 9, a horizontal axis shows the Y-axis direction (short-side direction) and the light reflectance obtained from a point A to a point A' in the Y-axis direction is plotted on a graph.

The diffuser plate 15 includes substantially a transparent (translucent) synthetic resin (for example, polystyrene) substrate containing a certain amount of light diffusing particles being dispersed therein. Light transmission and light reflectance is substantially uniform in a whole area of the diffuser plate 15. Preferable light transmission of the diffuser plate 15 is approximately 87.5% and preferable light reflectance of the diffuser plate 15 is approximately 12.5%. The diffuser plate 15 is formed in a rectangular plate with a plan view having substantially a same size as the bottom plate 14a of the chassis 14. The diffuser plate 15 includes a surface facing the cold cathode tubes 17 (hereinafter, referred to as a first surface 15a) and a surface on a side opposite from the first surface 15a facing the liquid crystal panel 11 (hereinafter, referred to as a second surface 15b). The first surface 15a is a light entrance surface that light from the cold cathode tubes 17 enters and the second surface 15b is a light exit surface through which light (illumination light) exits toward the liquid crystal panel 11. The diffuser plate 15 guides the entering light therein. Among the rays of light entering the first surface 15a and traveling through the diffuser plate 15, the light having an entry angle with respect to the second surface 15b greater than a critical angle completely reflects off the second surface 15b and completely reflects off the first surface 15a and the second surface 15b repeatedly to be guided along its plane (in the X-axis direction and the Y-axis direction). If the light strikes the diffusing particles while being guided through the diffuser plate 15, the light is diffused and exits from the second surface 15b.

As illustrated in FIG. 6, light reflecting portion 30 having a surface in white color are formed on the first surface 15a that is the light entrance surface of the diffuser plate 15. The light reflecting portion 30 is configured by a dot pattern. The light reflecting portion 30 is formed by arranging a number of dots 30a in a zigzag manner (in an offset arrangement). Each of the dots 30a is formed in a circle with a plan view. The dot pattern of the light reflecting portion 30 is formed by printing paste containing metal oxide, for example, on the surface of the diffuser plate 15. Preferable printing means is screen printing, inkjet printing and the like. The light reflecting portion 30 has a light reflectance of 75% and the diffuser plate 15 has in-plane light reflectance of 12.5%. Thus, the light reflecting portion 30 has a high light reflectance. In the present embodiment, the light reflectance of each material is represented by an average light reflectance inside the measurement circle measured with a LAV of CM-3700d (measurement area diameter of 25.4 mm) manufactured by Konica Minolta. The light reflectance of the light reflecting portion 30 is measured in the following method. The light reflecting portion 30 is formed over an entire surface of a glass substrate and the light reflectance of the surface is measured according to the above measurement means.

The diffuser plate 15 has a long-side direction (X-axis direction) and a short-side direction (Y-axis direction). The light reflectance of the first surface 15a of the diffuser plate 15a facing the cold cathode tubes 17 changes along the short-side direction by changing the dot pattern of the light reflecting portion 30 as illustrated in FIGS. 7 to 9. In other words, on the first surface 15a of the diffuser plate 15, the light reflectance of the portion that overlaps the cold cathode tubes 17 (referred to as a light source overlapping portion SA) is higher than the light reflectance of the portion that does not overlap the cold cathode tubes 17 (referred to as an empty area overlapping portion SN).

More specifically, in the light source overlapping portion SA of the diffuser plate 15, the light reflectance is uniform to be 50% and represents a maximum value on the diffuser plate 15. On the other hand, in the empty area overlapping portion SN of the diffuser plate 15, the light reflectance decreases in a continuous and gradual manner from the portion closer to the light source overlapping portion SA toward the portion away from the light source overlapping portion SA. The light reflectance is set to a lowest value that is 30% at a middle portion between the adjacent cold cathode tubes 17. The light reflectance is substantially uniform to be 30% at the middle portion between the adjacent cold cathode tubes 17 and in an area ranging from a point B to a point B' in the empty area overlapping portion SN of the diffuser plate 15.

A distribution of light reflectance of the diffuser plate 15 is determined by an area (a radial size) of each dot 30a of the light reflecting portion 30. The light reflectance of the light reflecting portion 30 is higher than the light reflectance of the diffuser plate 15. Therefore, the light reflectance relatively increases by relatively increasing the area occupied by the dots 30a of the light reflecting portion 30 and the light reflectance relatively reduces by relatively reducing the area occupied by the dots 30a of the light reflecting portion 30. Specifically, in the light source overlapping portion SA of the diffuser plate 15, the area occupied by the dots 30a of the light reflecting portion 30 is relatively large and uniform. In the empty area overlapping portion SN (excluding the area ranging from the point B to the point B' in the Y-axis direction), the light reflecting portion 30 is formed such that the area occupied by the dots 30a is continuously reduced away from the light source overlapping portion SA. As control means for controlling the light reflectance, the area of each dot of the light reflecting portion 30 may be set to be same and a distance between the dots may be changed.

A configuration of the second surface 15b of the diffuser plate 15 will be explained. As illustrated in FIG. 6, a light reflecting structure 31 is formed on the second surface 15b of the light guide plate 15 that is the light exit surface. The scattering structure 31 is formed over an entire surface of the second surface 15b of the diffuser plate 15. The scattering structure 31 includes a number of microscopic convex portions 31a that are formed integrally with the second surface 15b of the diffuser plate 15. Each of the convex portions 31a is formed to have substantially an arch-shaped cross section and a number of convex portions 31a are dispersed over an entire surface of the second surface 15b. A shape and a size of each convex portion 31a and the arrangement of the convex portions 31a in the surface of the second surface 15b are determined in an irregular manner. In the present embodiment, the scattering structure 31 is explained as aggregation of the convex portions. However, a recess is formed between the adjacent convex portions 31a and therefore, the scattering structure 31 could be configured by a number of microscopic recesses. The convex portions 31a of the scattering structure 31 are formed in the manufacturing process of the diffuser plate 15. Specifically, a transfer roller (not illustrated) having a certain corrugated pattern is prepared as the roller which transfers the diffuser plate 15 that is formed with resin molding in the manufacturing process. When the transfer roller transfers the diffuser plate 15, the corrugated pattern is transferred onto the second surface 15b of the diffuser plate 15 and the convex portions 31a are formed on the second surface 15a. Thus, surface roughness and distribution density of the scattering structure 31 on the second surface 15b of the diffuser plate 15 are easily controlled by adjusting the corrugated pattern of the transfer roller. Accordingly, the scattering structure 31 can be formed on the diffuser plate 15 easily with a low cost. The scattering structure 31 has substantially a uniform distribution density in the second surface 15b of the diffuser plate 15. The surface roughness (Rz) of the scattering structure 31 is preferably from 12 μm to 20 μm. The surface roughness (Rz) represents average roughness of ten points according to JIS B0601. "Microscopic" is referred to a condition in that a specific shape is less likely to be recognized by viewing an outer appearance and a specific shape is recognized by using a magnifying glass or a microscope.

The present embodiment has the above-described construction. Operations and effects thereof will be explained. When each cold cathode tube 17 is lit on to use the liquid crystal display device 10, rays of light emitted from each cold cathode tube 17 directly strike the first surface 15a of the diffuser plate or indirectly strike the first surface 15a after reflecting off the reflecting sheet 23. Then, the rays of light entering the diffuser plate 15 transmit through the diffuser plate 15 and exit from the second surface 15b toward the liquid crystal panel 11. Operations and effects of each component of the diffuser plate 15 will be explained in details.

As illustrated in FIG. 6, the light reflecting portion 30 is formed on the first surface 15a of the diffuser plate 15, which rays of light emitted from the cold cathode tubes 17 enter, such that the light reflectance is different in each surface area of the surface of the diffuser plate 15. Accordingly, the light entrance efficiency is appropriately controlled in every surface area in the first surface 15a. Specifically, a great amount of rays of light from the cold cathode tubes 17 directly enter the light source overlapping portion SA of the first surface 15a that overlaps the cold cathode tubes 17, and the amount of rays of light is relatively greater in the light source overlapping portion SA than in the empty area overlapping portion SN. The light reflectance of the light reflecting portion 30 is relatively increased in the light source overlapping portion SA (see FIGS. 7 to 9) to suppress (restrict) the rays of light from entering the first surface 15a and accordingly, a great amount of rays of light reflect off the light reflecting portion 30 and are returned into the chassis 14. The light reflecting portion 30 in the light source overlapping portion SA are formed to have uniform light reflectance. This makes the rays of light directing to the light source overlapping portion SA to reflect off (or transmit through) the light reflecting portion 30 uniformly. Accordingly, uniform brightness is achieved in the light source overlapping portion SA. A small amount of rays of light emitted from the cold cathode tubes 17 directly enter the empty area overlapping portion SN of the first surface 15a that does not overlap the cold cathode tubes 17, and the amount of rays of light is relatively smaller in the empty area overlapping portion SN than in the light source overlapping portion SA. The light reflectance of the light reflecting portion 30 is relatively reduced in the empty area overlapping portion SN (see FIGS. 7 to 9) to accelerate the entrance of rays of light into the first surface 15a. The rays of light that reflect off the light reflecting portion 30 in the light source overlapping portion SA into the chassis 14 are guided to the empty area overlapping portion SN by the reflecting sheet 23 and this compensates for the amount of rays of light in the empty area overlapping portion SN. Therefore, the sufficient amount of rays of light entering the empty area overlapping portion SN is ensured. This achieves the uniform light reflectance of rays of light in the first surface 15a of the diffuser plate 15.

The rays of light entering the diffuser plate 15 travel through the diffuser plate 15 and exit from the second surface 15b toward the liquid crystal panel 11 side. In this process, among the rays of light traveling through the diffuser plate 15 and reaching the second surface 15b, the rays of light having an incident angle with respect to the second surface 15b greater than a critical angle totally reflect off the second surface 15b. Then, the rays of light totally reflect off the first surface 15a and the second surface 15b repeatedly to be guided along the plane direction. During the guiding process, if the rays of light strike the diffuser particles, the rays of light are diffused to generate rays of light having an incident angle with respect to the second surface 15b that is smaller than the critical angle and the generated rays of light exit from the second surface 15b.

The light entrance efficiency of the diffuser plate 15 in every surface area of the surface of the diffuser plate 15 is controlled by the light reflecting portion 30, and therefore, the rays of light entering the diffuser plate 15 have directivity influenced by the light reflecting portion 30. If the second surface 15b of the diffuser plate 15 that is a light exit surface is a flat and smooth surface, the rays of light having directivity influenced by the light reflecting portion 30 exit from the second surface 15b. This may cause viewing angle dependency of brightness. Especially, if the second surface 15b is viewed obliquely, a shape of the light reflecting portion 30 may be recognized as uneven brightness via the diffuser plate 15.

According to the present embodiment, the scattering structure 31 that scatters rays of light is provided on the second surface 15b of the diffuser plate 15 that is a light exit surface. Therefore, the scattering structure 31 scatters rays of light exiting from the second surface 15b and this substantially cancels the directivity of the exiting rays of light (illumination light). Specifically, if the rays of light traveling through the diffuser plate 15 reach the second surface 15b, the rays of light are scattered by the surfaces of the microscopic convex portions 31a that form the scattering structure 31 and exit therefrom to an external space. A shape and a size of the convex portion 31a and the arrangement of the convex portions 31a on the second surface 15b are determined in an irregular manner. This makes a light exiting direction to be arbitrary. Accordingly, the rays of light traveling in the diffuser plate 15 do not exit from the second surface 15b with having the directivity influenced by the light reflecting portion 30. The viewing angle dependency of brightness is less likely to be caused. Further, the distribution density of the convex portions 31a forming the scattering structure 31 is substantially uniform in the surface of the second surface 15b. This achieves uniform scattering degree of the rays of light exiting from the second surface 15b in its surface. Accordingly, the viewing angle dependency of brightness is less likely to be caused. Further, the surface roughness (Rz) of the scattering structure 31 is from 12 µm to 20 µm, and therefore, the rays of light are scattered efficiently without causing the viewing angle dependency. If the surface roughness is greater than 20 µm, the light scattering is insufficient and the viewing angle dependency may not be effectively suppressed. If the surface roughness is smaller than 12 µm, rays of light are excessively scattered. This may generate rays of light including unnecessary components for illuminating the liquid crystal panel 11 and this may lower light using efficiency and result in insufficient brightness.

EXAMPLES

Experiments for recognition of uneven brightness are made in an example using the diffuser plate 15 of the above embodiment and in a comparative example using a diffuser plate having a different construction from the above embodiment and the results are shown in Table 1. In the comparative experiments, one cold cathode tube arranged on a rear side of the diffuser plate is lit on and the diffuser plate is visually confirmed from a front side. "Front view" in Table 1 represents that the cold cathode tube is visually confirmed from a front side at a position directly above the cold cathode tube. "Oblique view" in Table 1 represents that the cold cathode tube is visually confirmed obliquely at an angle of 45 degrees offset from the position directly above the cold cathode tube. In Table 1, the symbol of "⊚" represents that uneven brightness is not recognized, the symbol of "○" represents that uneven brightness is substantially not recognized, the symbol of "Δ" represents that uneven brightness is slightly recognized, and the symbol of "X" represents that uneven brightness is recognized.

In the Comparative Example 1, a diffuser plate is configured to exclude the scattering structure 31 from the diffuser plate 15 of the above embodiment. In the Comparative Example 2, a diffuser sheet (not illustrated) containing a certain amount of diffuser particles dispersed therein is provided on the diffuser plate of the Comparative Example 1. The diffuser sheet is thinner than the diffuser plate of the Comparative Example 1. Light reflectance of the diffuser sheet of the Comparative Example 2 is 60% and is uniform in an entire area.

TABLE 1

|  | Front view | Oblique view |
|---|---|---|
| Comparative Example 1 | X | X |
| Comparative Example 2 | ○ | Δ |
| Embodiment | ◎ | ○ |

As is apparent from Table 1, uneven brightness does not occur with using the diffuser plate 15 of the present embodiment. If the diffuser sheet is additionally provided on the diffuser plate as is in the Comparative Example 2, uneven brightness does not substantially occur. However, the number and the kinds of the optical members are increased. This increases a manufacturing cost of the diffuser sheet and a cost for preparing the components such as a management cost for the diffuser sheet and also increases the number of assembling processes for the backlight device, and this eventually increases a total cost. In using the diffuser plate 15 of the present embodiment, improved effect for restricting uneven brightness from occurring is achieved without providing the diffuser sheet on the diffuser plate, and this enables to achieve uniform brightness with a low cost.

As is explained above, the backlight device 12 according to the present embodiment includes the cold cathode tubes 17, the chassis 14 that houses the cold cathode tubes 17 therein and includes the opening 14b through which light from the cold cathode tubes 17 exit, and the diffuser plate 15 that is arranged to face the cold cathode tubes 17 and cover the opening 14b. The light reflecting portion 30 is formed on the diffuser plate 15 on the cold cathode tube 17 side. The light reflecting portion 30 is configured to have different light reflectance in every surface area of a surface of the diffuser plate 15. The scattering structure 31 is formed on the diffuser plate 15 on an opposite side from the cold cathode tubes 17. The scattering structure 31 scatters light.

Accordingly, the rays of light emitted from the cold cathode tubes 17 enter the diffuser plate 15 with the entrance efficiency being controlled for every surface area by the light reflecting portion 30 that has different light reflectance for every surface area of the surface of the diffuser plate 15. When the rays of light entering the diffuser plate 15 exit from a side of the diffuser plate 15 opposite from the cold cathode tubes 17, the rays of light are scattered by the scattering structure 31. Therefore, the exiting illumination light is less likely to have directivity that is influenced by the light reflecting portion 30 and the viewing angle dependency of brightness is less likely to occur. In the scattering structure 31 formed on the diffuser plate 15, the number of components is reduced compared to the case in that another optical sheet (diffuser sheet) is provided on the diffuser plate 15 instead of the scattering structure 31.

The scattering structure 31 includes a number of microscopic convex portions 31a. Accordingly, the microscopic convex portions 31a effectively scatter light. "Microscopic" is referred to a condition in that a specific shape is less likely to be recognized by viewing an outer appearance and a specific shape is recognized by using a magnifying glass or a microscope.

The scattering structure 31 is configured by the corrugated pattern that is transferred to the surface of the diffuser plate 15 by the transfer roller. Accordingly, the scattering structure 31 is formed with a low cost.

The convex portions 31a of the scattering structure 31 are formed such that the distribution density of the diffuser plate 15 is substantially uniform in its surface. Accordingly, the light scattering degree of the diffuser plate 15 is substantially uniform in its surface and the viewing angle dependency of brightness is less likely to occur.

The surface roughness (Rz) of the scattering structure 31 is from 12 μm to 20 μm. Accordingly, the light is effectively scattered without causing the viewing angle dependency. If the surface roughness is greater than 20 μm, the light scattering is insufficient and the viewing angle dependency may not be effectively suppressed. If the surface roughness is smaller than 12 μm, rays of light are excessively scattered and this may lower light using efficiency and result in insufficient brightness. The surface roughness (Rz) represents average roughness of ten points according to JIS B0601.

The scattering structure 31 is formed over an entire surface of the diffuser plate 15. Accordingly, the viewing angle dependency is less likely to occur.

The light reflecting portion 30 is formed at least on the light source overlapping portion SA of the diffuser plate 15 that overlaps the cold cathode tubes 17. Accordingly, the cold cathode tubes 17 are less likely to be recognized via the diffuser plate 15 and uneven brightness is less likely to be caused.

The light reflecting portion 30 is also formed on the empty area overlapping portion SN of the diffuser plate 15 that does not overlap the cold cathode tubes 17. The light reflectance in the light source overlapping portion SA is higher than the light reflectance in the empty area overlapping portion SN. According to such a configuration, in the light source overlapping portion SA having a relatively great amount of rays of light directed to the diffuser plate 15, the light reflectance of the light reflecting portion 30 is relatively high. Therefore, the rays of light relatively easily reflect off the light source overlapping portion SA and reflecting light is guided to the empty area overlapping portion SN having a relatively small amount of rays of light. In the empty area overlapping portion SN, the light reflectance of the light reflecting portion 30 is relatively low and rays of light relatively easily transmit therethrough. Accordingly, uniform light entrance efficiency of the diffuser plate 15 is achieved in its surface.

The light reflecting portion 30 is formed such that the light reflectance of the diffuser plate 15 in its surface decreases in a gradual and continuous manner from the light source overlapping portion SA to the empty area overlapping portion SN. The light reflectance in the light reflecting portion 30 decreases in a gradual and continuous manner from the light source overlapping portion SA to the empty area overlapping portion SN so as to have a gradation. This makes the distribution of illumination light brightness in the empty area overlapping portion SN to be moderate and the backlight device 12 can achieve a moderate distribution of illumination light brightness.

The cold cathode tubes 17 are arranged in an entire surface of the diffuser plate 15 within the chassis 14. Accordingly, uneven brightness is less likely to be caused.

The light reflecting portion 30 is formed by a dot pattern having light reflectivity. The light reflecting portion 30 of a dot pattern controls the reflection intensity according to the pattern type (such as the number of dots and an area of each dot). Accordingly, uniform brightness is easily obtained.

The diffuser plate 15 contains diffuser particles diffused therein. Accordingly, rays of light emitted from the cold cathode tubes 17 are dispersed by the diffuser particles when transmitting through the diffuser plate 15. Accordingly, the viewing angle dependency of brightness is less likely to occur.

The light reflecting portion 30 has light reflectance higher than the diffuser plate 15. Accordingly, the light entrance efficiency with respect to the diffuser plate is appropriately controlled.

The first embodiment of the present invention has been described, however, the present invention is not limited to the above embodiments explained in the above description and the drawings. The following embodiments may be included in the technical scope of the present invention, for example.

[First Modification of First Embodiment]

Figure 10:
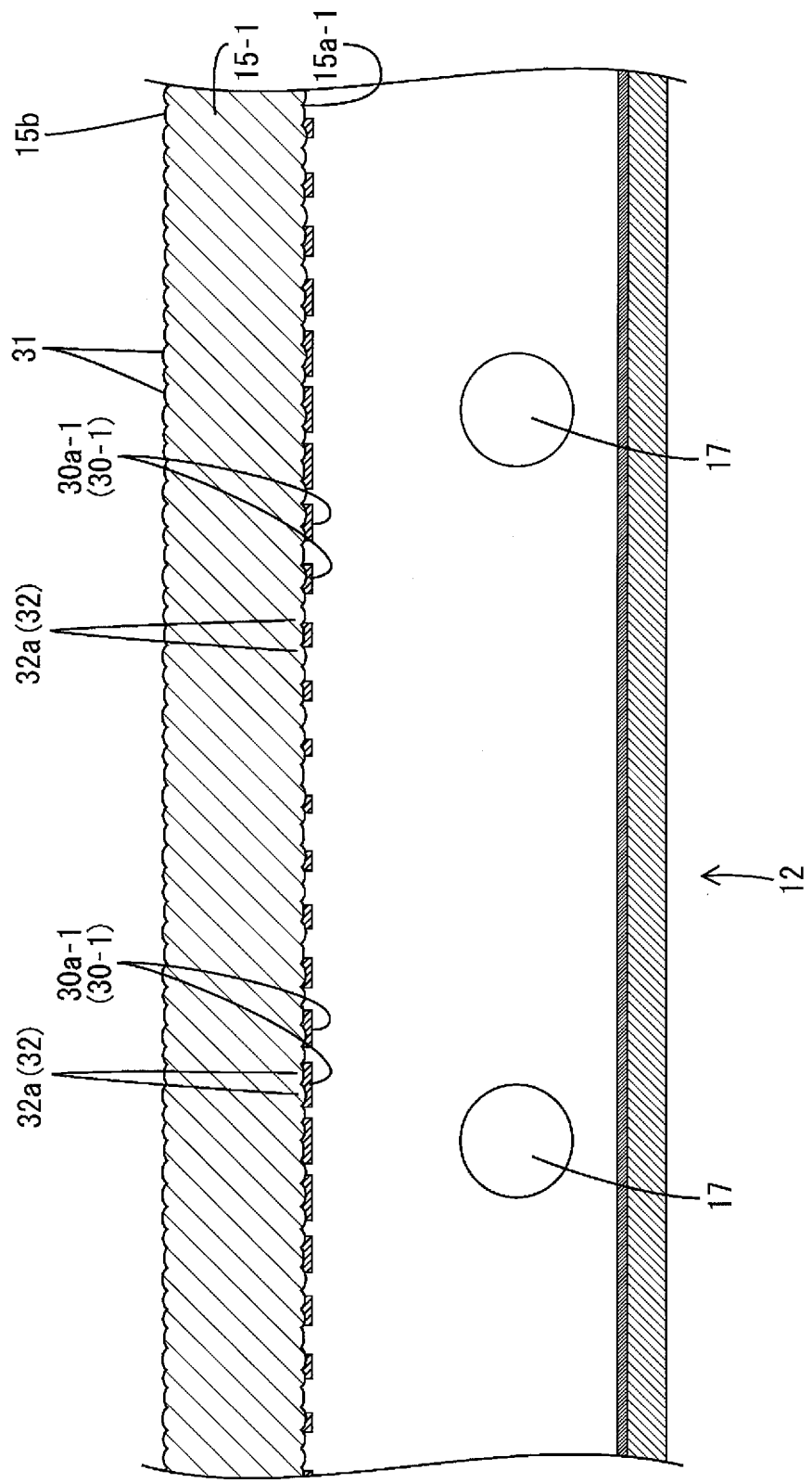
FIG. 10 is a partially-enlarged plan view illustrating a detailed construction of a diffuser plate according to a first modification of the first embodiment.

A first modification of the backlight device 12 of the first embodiment will be explained with reference to FIG. 10. A scattering structure 32-1 is provided on a first surface 15a-1 of a diffuser plate 15-1. FIG. 10 is a partially-enlarged cross-sectional view illustrating a detailed structure of the diffuser plate of this modification.

A second scattering structure 32-1 is formed on the first surface 15a-1 of the diffuser plate 15-1 that faces the cold cathode tubes 17 and forms the light entrance surface. The second scattering structure 32-1 is similar to the scattering structure 31 formed on the second surface 15b that is the light exit surface. The second scattering structure 32 is configured to have a number of microscopic convex portions 32a in a surface of the first surface 15a-1 with dispersed. A shape and a size of the convex portion 32a and the arrangement of the convex portions 32a in the surface of the diffuser plate 15-1 are determined in an irregular method. The second scattering structure 32 is formed over an entire surface of the first surface 15a-1. The second scattering structure 32 overlaps the light reflecting portion 30-1 in a plan view. The light reflecting portion 30-1 is formed on the second scattering structure 32. That is, the second scattering structure 32 is provided on an opposite side of the light reflecting portion 30-1 from the cold cathode tubes 17, that is, on a light exit side. Therefore, among the rays of light emitted from the cold cathode tubes 17, the rays of light striking a portion of the first surface 15a-1 between the dots 30a-1 of the light reflecting portion 30-1 are scattered by the second scattering structure 32 and enter the diffuser plate 15-1. Among the rays of light emitted from the cold cathode tubes 17, the rays of light transmitting through the light reflecting portion 30-1 and striking the first surface 15a-1 are also scattered by the second scattering structure 32 and enter the diffuser plate 15-1. The rays of light having directivity influenced by the light reflecting portion 30-1 are scattered by the second scattering structure 32 and enter the diffuser plate 15-1. Therefore, the directivity is weakened at the entrance of light into the diffuser plate 15-1. Moreover, the rays of light entering the diffuser plate 15-1 are scattered again by the scattering structure 31 when exiting from the second surface 15b. Therefore, the viewing angle dependency of brightness is less likely to occur.

As is explained above, according to the first modification, the scattering structure 32 is formed also on aside of the diffuser plate 15-1 close to the cold cathode tubes 17. Accordingly, rays of light emitted from the cold cathode tubes 17 are scattered by the scattering structure 32 formed on the side of the diffuser plate 15-1 close to the cold cathode tubes 17 when entering the diffuser plate 15-1. Therefore, the viewing angle dependency of brightness is less likely to occur.

The scattering structure formed on the side of the diffuser plate 15-1 close to the cold cathode tubes 17 is formed to overlap at least the light reflecting portion 30-1 and formed on an opposite side of the light reflecting portion 30-1 from the cold cathode tubes 18. Accordingly, rays of light transmit the light reflecting portion 30-1 at a ratio according to the light reflectance. The rays of light entering the diffuser plate 15-1 from the light reflecting portion 30-1 are scattered by the scattering structure 32, and therefore, the viewing angle dependency of brightness is less likely to occur.

[Second Modification of First Embodiment]

Figure 11:
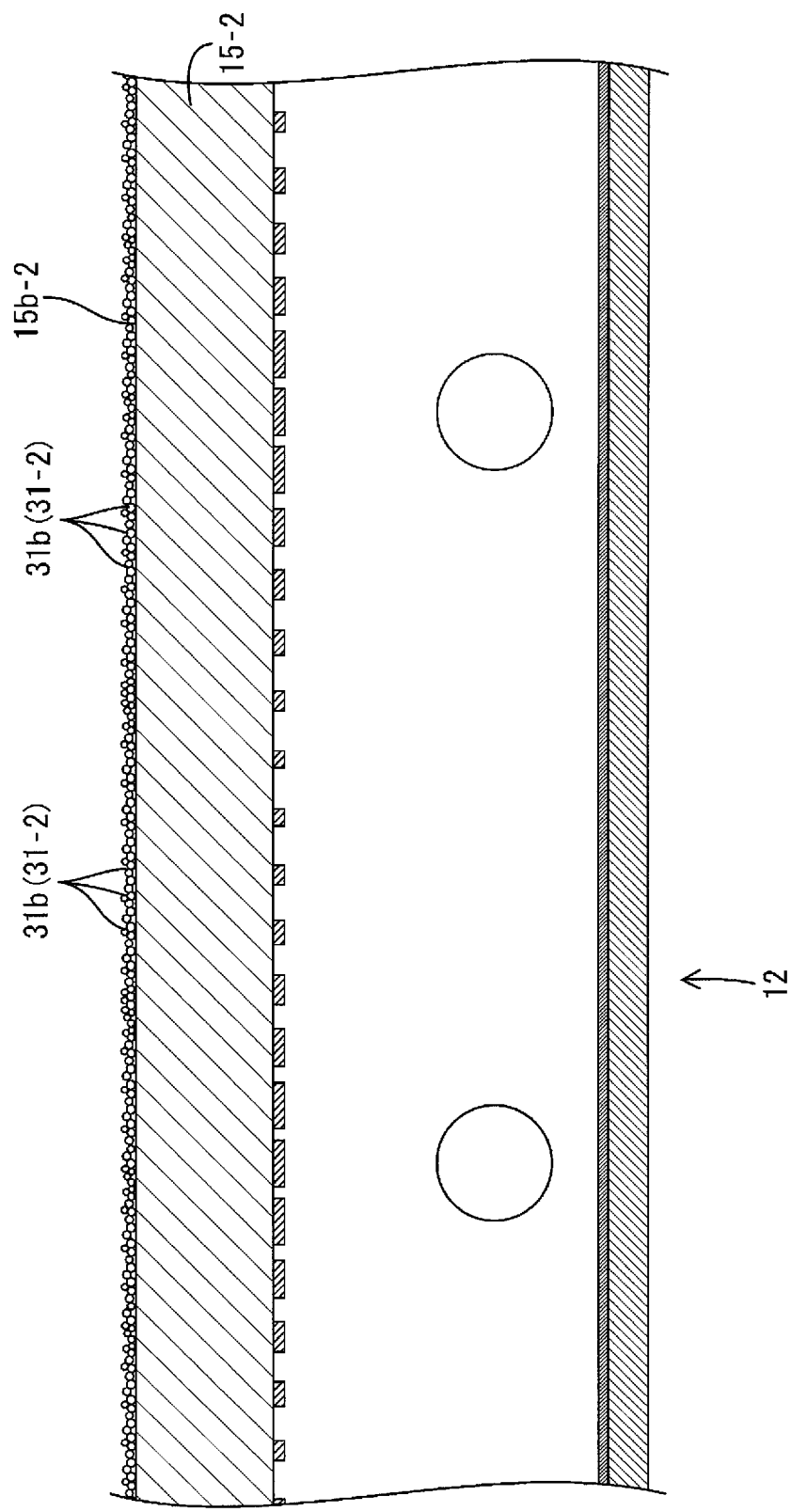
FIG. 11 is a partially-enlarged plan view illustrating a detailed construction of a diffuser plate according to a second modification of the first embodiment.

A second modification of the backlight device 12 of the first embodiment will be explained with reference to FIG. 11. In the second modification, a scattering structure 31-2 of a diffuser plate 15-2 is altered from the one in the first embodiment. FIG. 11 is an enlarged cross-sectional view illustrating a detailed configuration of the diffuser plate of the second modification.

The scattering structure 31-2 is configured by diffuser particles 31b that are adhered to a second surface 15b-2 of the diffuser plate 15-2 with being dispersed. The diffuser particles are an inorganic material (for example, silica beads) and are dispersed in the second surface 15b-2 at substantially a uniform distribution density. The diffuser particles 31b are adhered to the second surface 15b-2 with an adhesive layer. With the configuration in that the scattering structure 31-2 is configured by the diffuser particles 31b, rays of light exiting from the second surface 15-2 are effectively scattered.

As is explained above, according to the second modification, the scattering structure 31-2 is configured by the diffuser particles 31b adhered to the surface of the diffuser plate 15-2 with being dispersed. Accordingly, rays of light are effectively scattered by the diffuser particles 31b.

[Third Modification of First Embodiment]

Figure 12:
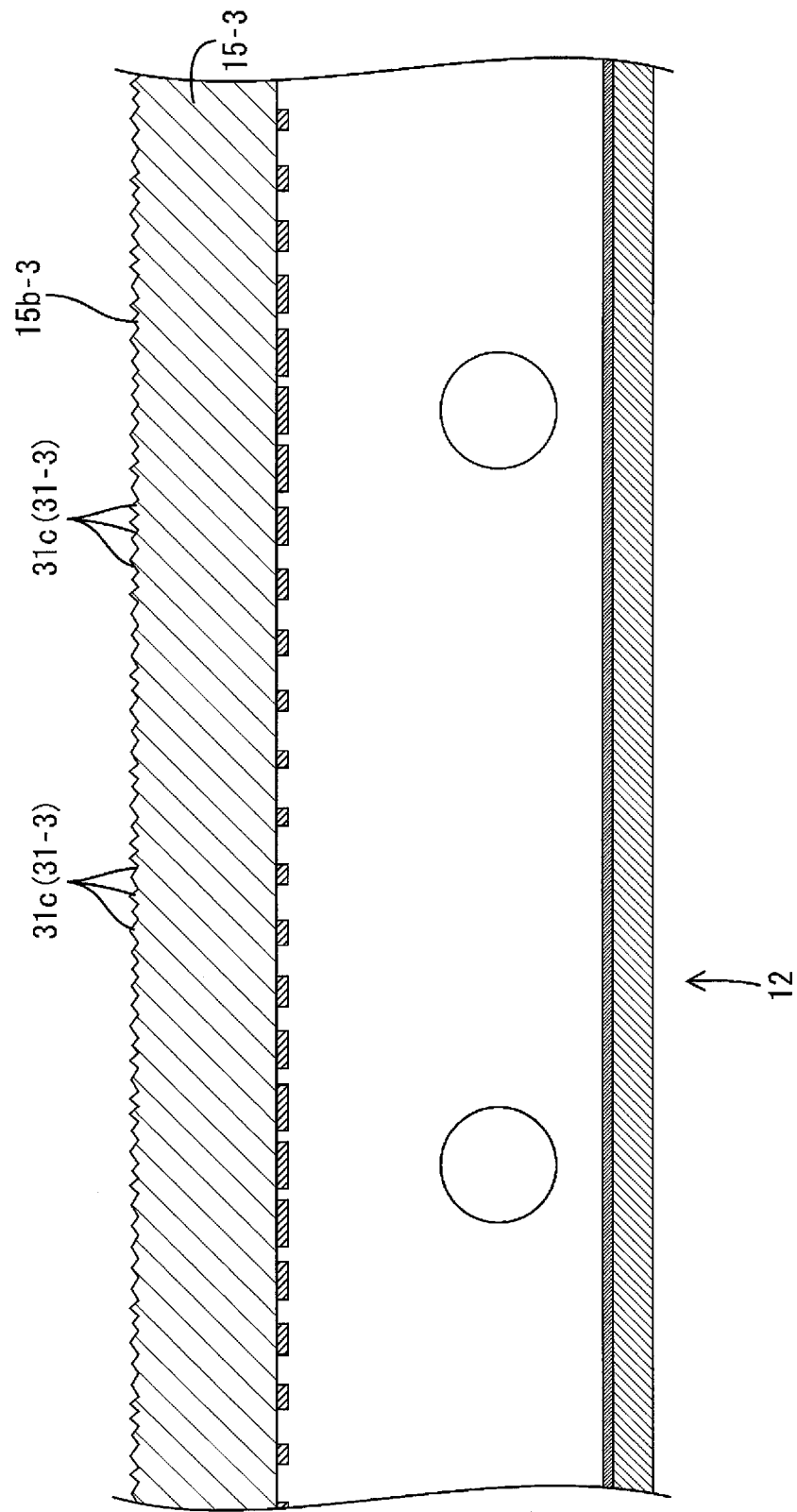
FIG. 12 is a partially-enlarged plan view illustrating a detailed construction of a diffuser plate according to a third modification of the first embodiment.

A third modification of the backlight device 12 of the first embodiment will be explained with reference to FIG. 12. A scattering structure 31-3 of a diffuser plate 15-3 is altered from the one in the first embodiment. FIG. 12 is an enlarged cross-sectional view illustrating a detailed construction of the diffuser plate.

A convex portion 31c of the scattering structure 31-3 is formed to have substantially a triangle cross section. With the convex portions 31c having such a shape, rays of light exiting from the second surface 15b-3 are effectively scattered.

[Fourth Modification of First Embodiment]

Figure 13:
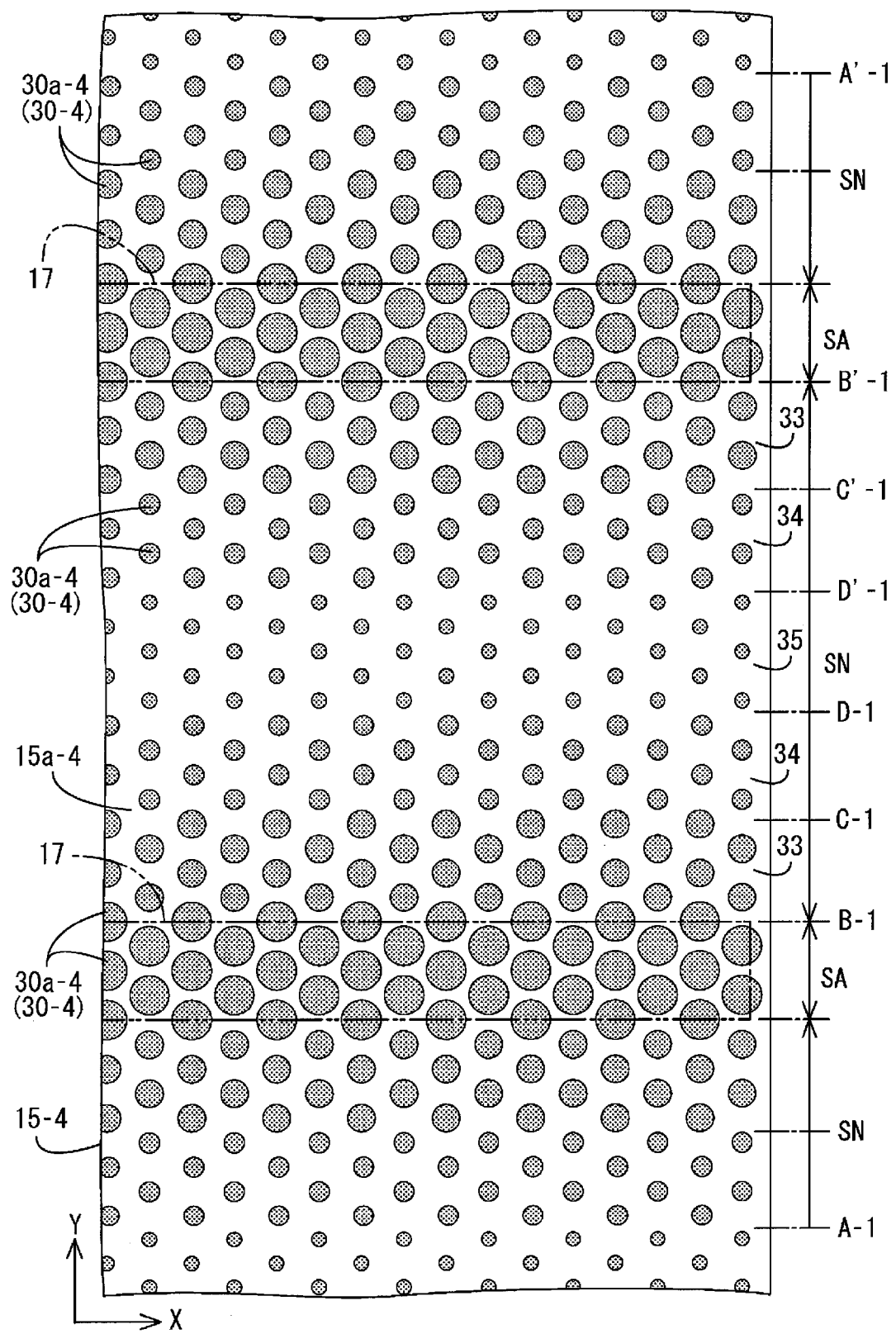
FIG. 13 is a partially-enlarged plan view illustrating a general construction of a surface of a diffuser plate facing cold cathode tubes according to a fourth modification of the first embodiment.
Figure 14:
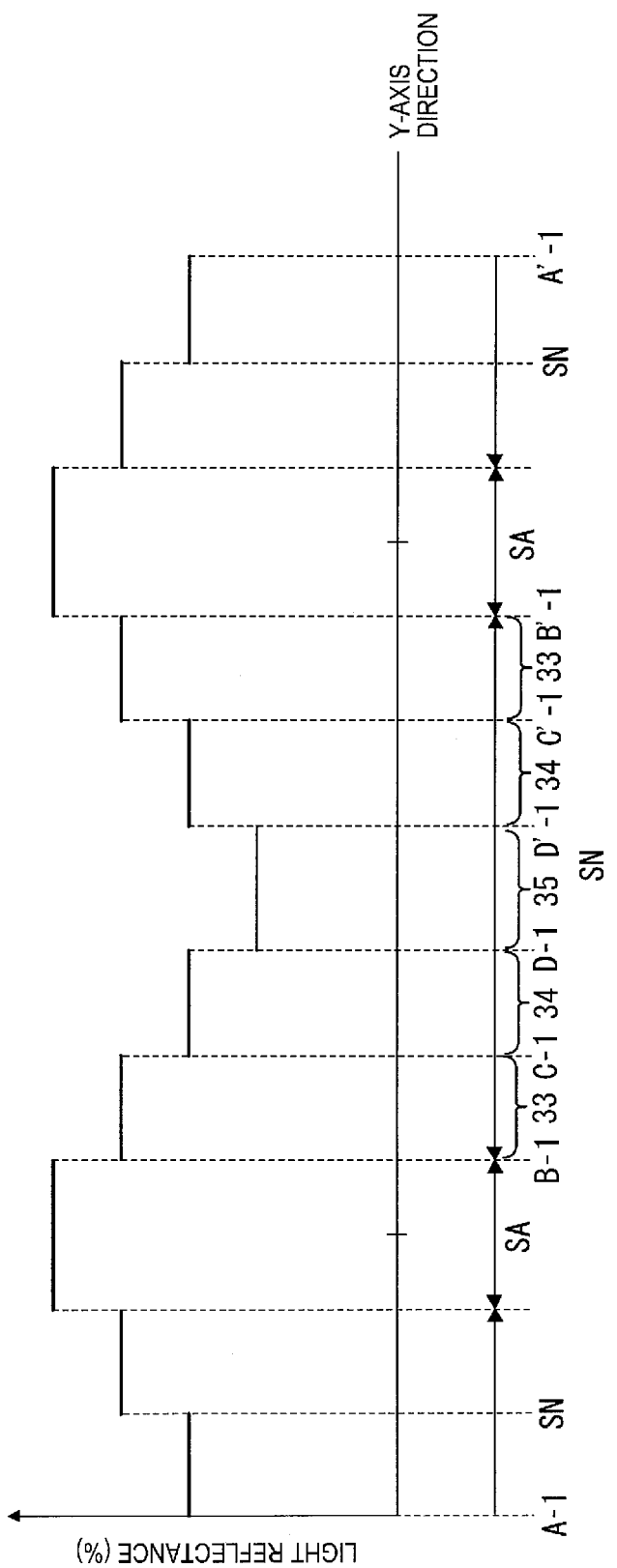
FIG. 14 is a graph illustrating a light reflectance change in the short-side direction of the diffuser plate in FIG. 13.

A fourth modification of the backlight device 12 of the first embodiment will be explained with reference to FIGS. 13 and 14. An arrangement of light reflecting portion 30-4 on a first surface 15a-4 of a diffuser plate 15-4 is altered from the one in the first embodiment. FIG. 13 is an enlarged plan view illustrating a general construction of a surface of the diffuser plate facing the cold cathode tubes 17 according to the fourth modification. FIG. 14 is a graph illustrating light reflectance change in the short-side direction of the diffuser plate.

As illustrated in FIG. 13, the light reflecting portion 30-4 is formed such that light reflectance of a first surface 15a-4 of the diffuser plate 15-4 in its surface reduces in a stepwise manner from the light source overlapping portion SA to the empty area overlapping portion SN. An area (light reflectance) of each dot 30a-4 of the light reflecting portion 30-4 is greatest in the light source overlapping portion SA and decreases in a stepwise manner in a direction away from the light source overlapping portion SA. Specifically, the light reflectance is greatest and uniform in the light source overlapping portion SA, and the light reflectance decreases in the empty area overlapping portion SN in a stepwise and gradual manner in a direction away from the light source overlapping portion SA. The light reflectance is smallest in a portion farthest from the light source overlapping portion SA, that is in a middle portion between the adjacent cold cathode tubes 17. In the empty area overlapping portion SN, the light reflectance of the light reflecting portion 30-4 changes in a stripe pattern along the short-side direction (Y-axis direction) of the light guide plate 15-4.

Specifically, as illustrated in FIGS. 13 and 14, the light reflectance of the light reflecting portion 30-4 in the empty area overlapping portion SN decreases in a stepwise manner from a first area 33, a second area 34 to a third area 35 in this order. The first area 33 ranges from a point B-1 (B'-1) to a point C-1 (C'-1) in the Y-axis direction. The second area 34 ranges from a point C-1 (C'-1) to a point D-1 (D'-1) in the Y-axis direction. The third area 35 ranges from the point D-1 to the point D'-1 in the Y-axis direction. The first area 33 is closest to the light source overlapping portion SA and the light reflectance of the first area 33 is highest in the empty area overlapping portion SN. The third area 35 is located in a middle portion between the adjacent cold cathodes 17 and farthest from the light source overlapping portion SA. The light reflectance of the third area 35 is lowest in the whole area of the light reflecting portion 30-4. The second area 34 is located between the first area 33 and the third area 35 and the light reflectance of the second area 34 is lower than that of the first area 33 and higher than that of the third area 35.

The light reflectance of the diffuser plate 15-4 decreases in a stepwise and gradual manner from light source overlapping portion SA, the first area 33, the second area 34 and the third area 35 in the empty area overlapping portion SN sequentially in this order, that is, from the portion closer to the light source overlapping portion SA toward the portion farther therefrom. This makes the brightness distribution of illumination light exiting from the diffuser plate 15-4 to be moderate. Further, with forming a number of areas including the light source overlapping portion SA, the first area 33, the second area 34 and the third area 35 each having different light reflectance, the method of manufacturing the diffuser plate 15-4 becomes simple and this contributes to cost reduction.

As is explained above, according to the fourth modification, the light reflecting portion 30-4 is formed such that the light reflectance of the diffuser plate 15-4 in its surface decreases in a continuous and gradual manner from the light source overlapping portion SA to the empty area overlapping portion SN. The light reflecting portion 30-4 is formed such that the light reflectance of the diffuser plate 15-4 in its surface decreases in a stepwise and gradual manner from the light source overlapping portion SA to the empty area overlapping portion SN. The light reflectance of the light reflecting portion 30-4 decreases in a stepwise and gradual manner from the light source overlapping portion SA to the empty area overlapping portion SN so as to have a gradation. This makes the distribution of illumination light brightness in the empty area overlapping portion SN to be further moderate and the backlight device 12 can achieve a further moderate distribution of illumination light brightness.

[Fifth Modification of First Embodiment]

Figure 15:
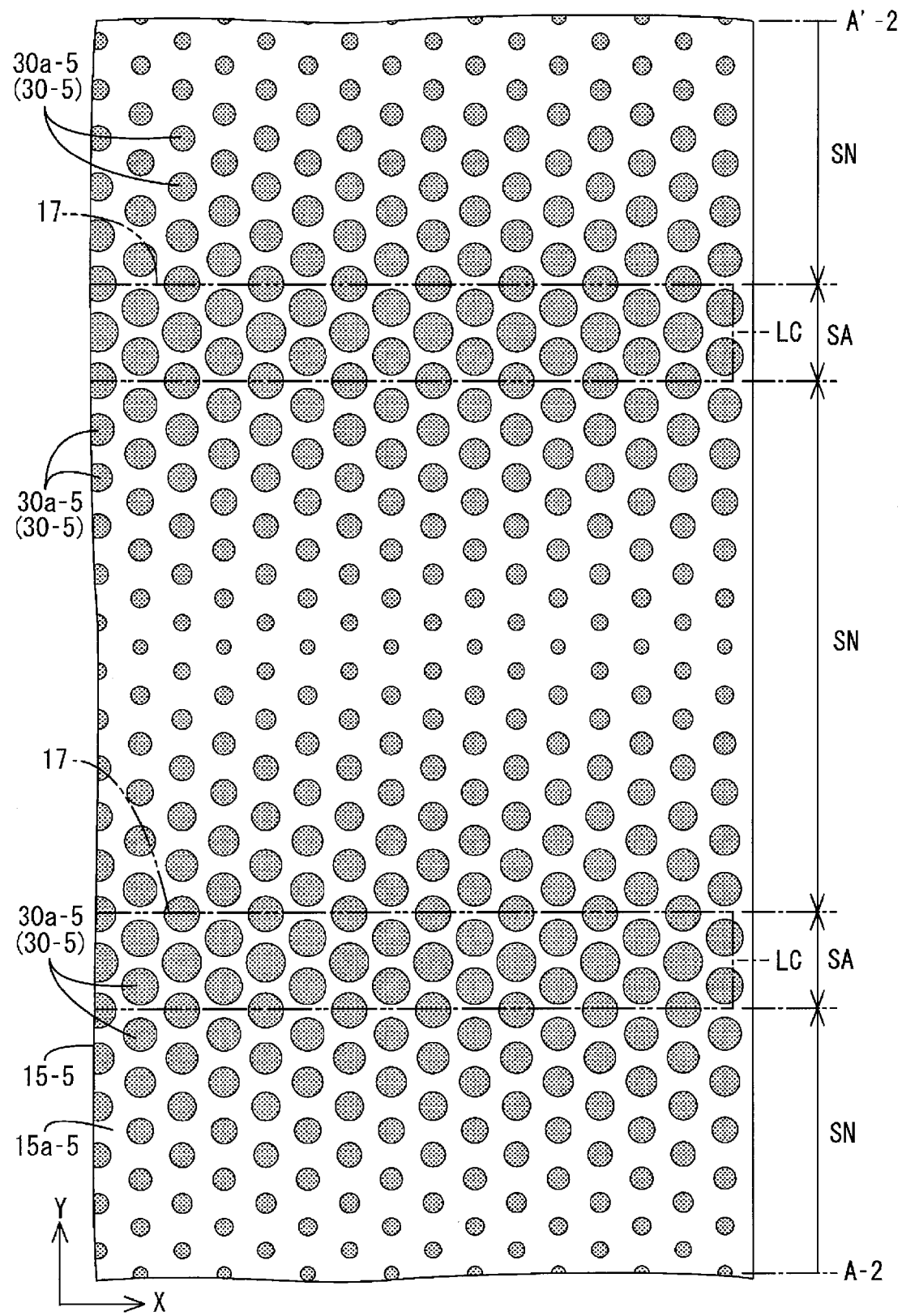
FIG. 15 is a partially-enlarged plan view illustrating a general construction of a surface of a diffuser plate facing cold cathode tubes according to a fifth modification of the first embodiment.
Figure 16:
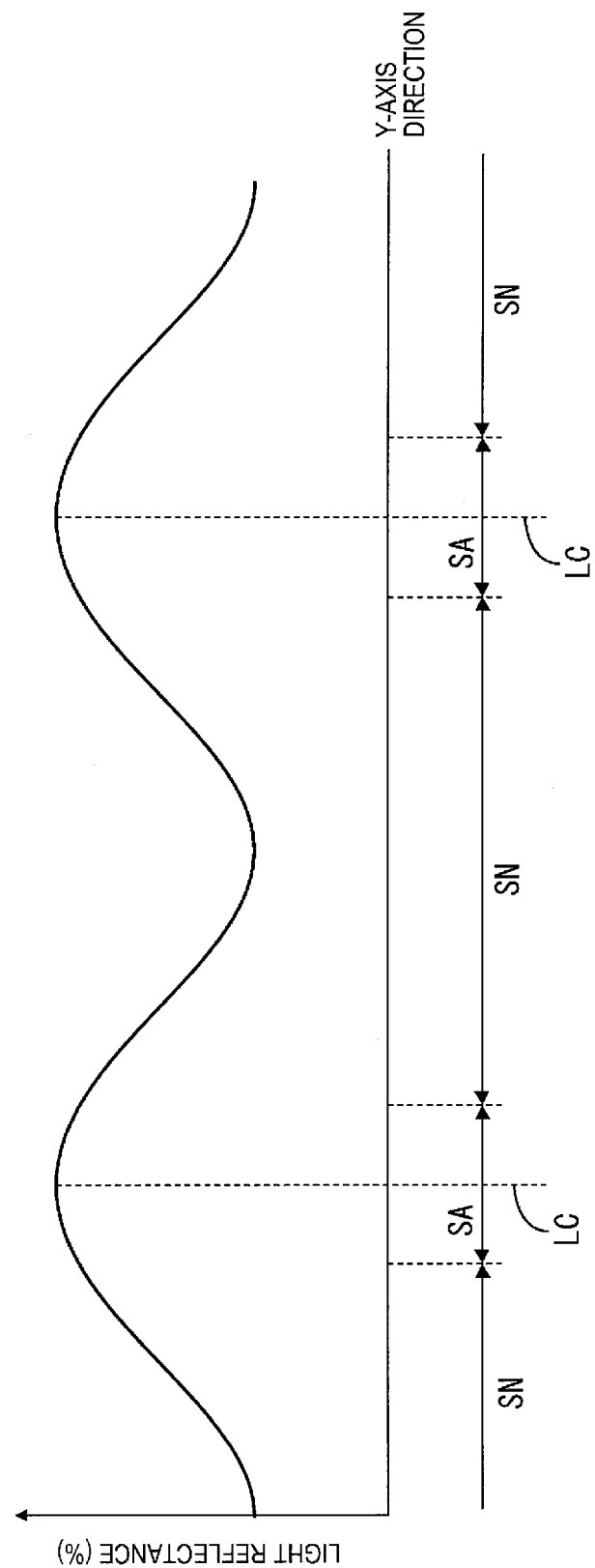
FIG. 16 is a graph illustrating a light reflectance change in the short-side direction of the diffuser plate in FIG. 15.

A fifth modification of the backlight device 12 of the first embodiment will be explained with reference to FIGS. 15 and 16. An arrangement of light reflecting portion 30-5 on a first surface 15a-5 of a diffuser plate 15-5 is altered from that in the first embodiment. FIG. 15 is an enlarged plan view illustrating a general construction of a surface of the diffuser plate facing the cold cathode tubes according to the fifth modification. FIG. 16 is a graph illustrating light reflectance change in the short-side direction of the diffuser plate.

As illustrated in FIGS. 15 and 16, the light reflecting portion 30-5 is formed such that the light reflectance of the first surface 15a-5 of the diffuser plate 15-5 in its surface decreases in a continuous and gradual manner from the light source overlapping portion SA to the empty area overlapping portion SN. Namely, an area (light reflectance) of each of dots 30a-5 that form the light reflecting portion 30-5 decreases in a continuous manner in a direction away from the light source overlapping portion SA. Specifically, each of the dots 30a-5 provided in a middle portion in the light source overlapping portion SA in the Y-axis direction, that is on a center LC of the cold cathode tube 17 has a greatest area. An area of each dot 30a-5 reduces in a continuous manner as is closer to the middle portion in the empty area overlapping portion SN in the Y-axis direction. An area of each of the dots 30a-5 provided in the middle portion in the empty area overlapping portion SN in the Y-axis direction is smallest. In other words, the area of each of the dots 30a-5 reduces as the distance from the center LC of the cold cathode tube 17 becomes longer.

With the diffuser plate 15-5 having such a construction, the brightness distribution of illumination light in the whole diffuser plate 15-5 becomes moderate and this eventually achieves a moderate illumination brightness distribution in the whole backlight device 12.

As is explained above, according to the fifth modification, the light reflecting portion 30-5 is formed such that the light reflectance of the diffuser plate 15-5 in its surface decreases in a continuous and gradual manner from the light source overlapping portion SA to the empty area overlapping portion SN. Thus, the light reflecting portion 30-5 is formed such that the light reflectance of the diffuser plate 15-5 in its surface decreases in a continuous and gradual manner from the light source overlapping portion SA to the empty area overlapping portion SN so as to have a gradation. This makes the brightness distribution of illumination light in the empty area overlapping portion SN to be moderate and this achieves a moderate illumination brightness distribution in the whole backlight device 12.

Second Embodiment

Next, a second embodiment of the present invention will be explained with reference to FIGS. 17 to 21. In the second embodiment, the arrangement of the cold cathode tubes 17 and the arrangement of light reflecting portion 300 are modified, and other configurations are same as the first embodiment. The same parts as the first embodiment are indicated by the same symbols and will not be explained.

Figure 17:
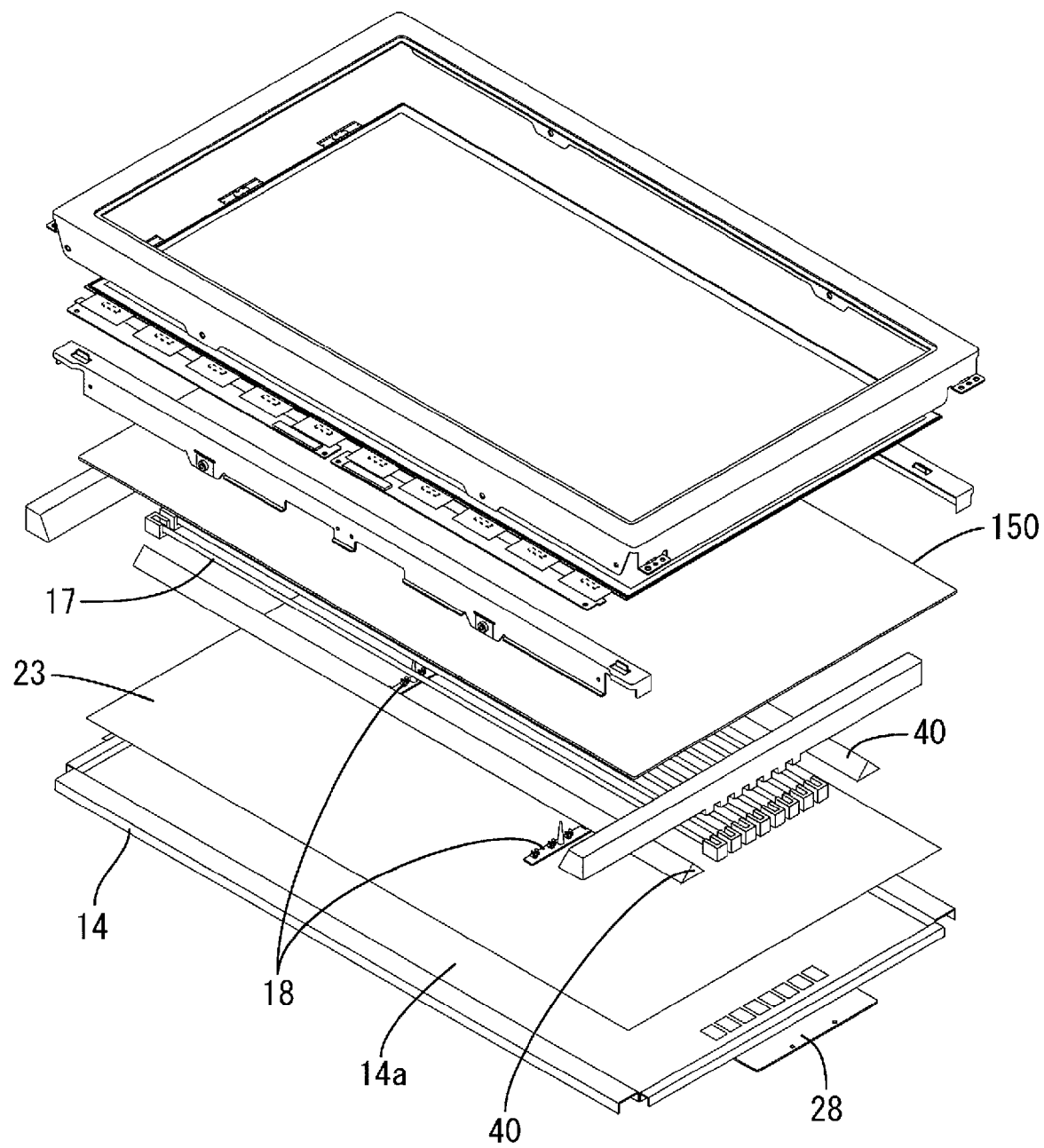
FIG. 17 is an exploded perspective view illustrating a construction of a liquid crystal display device according to a second embodiment of the present invention.
Figure 18:
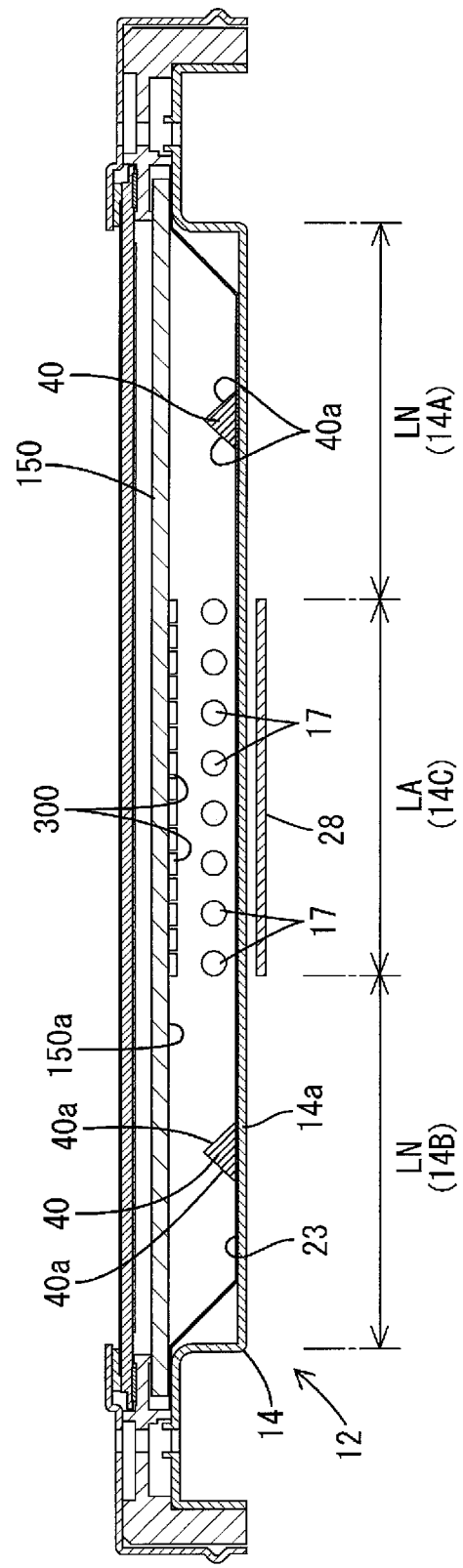
FIG. 18 is a cross-sectional view of the liquid crystal display device along the short-side direction.
Figure 19:
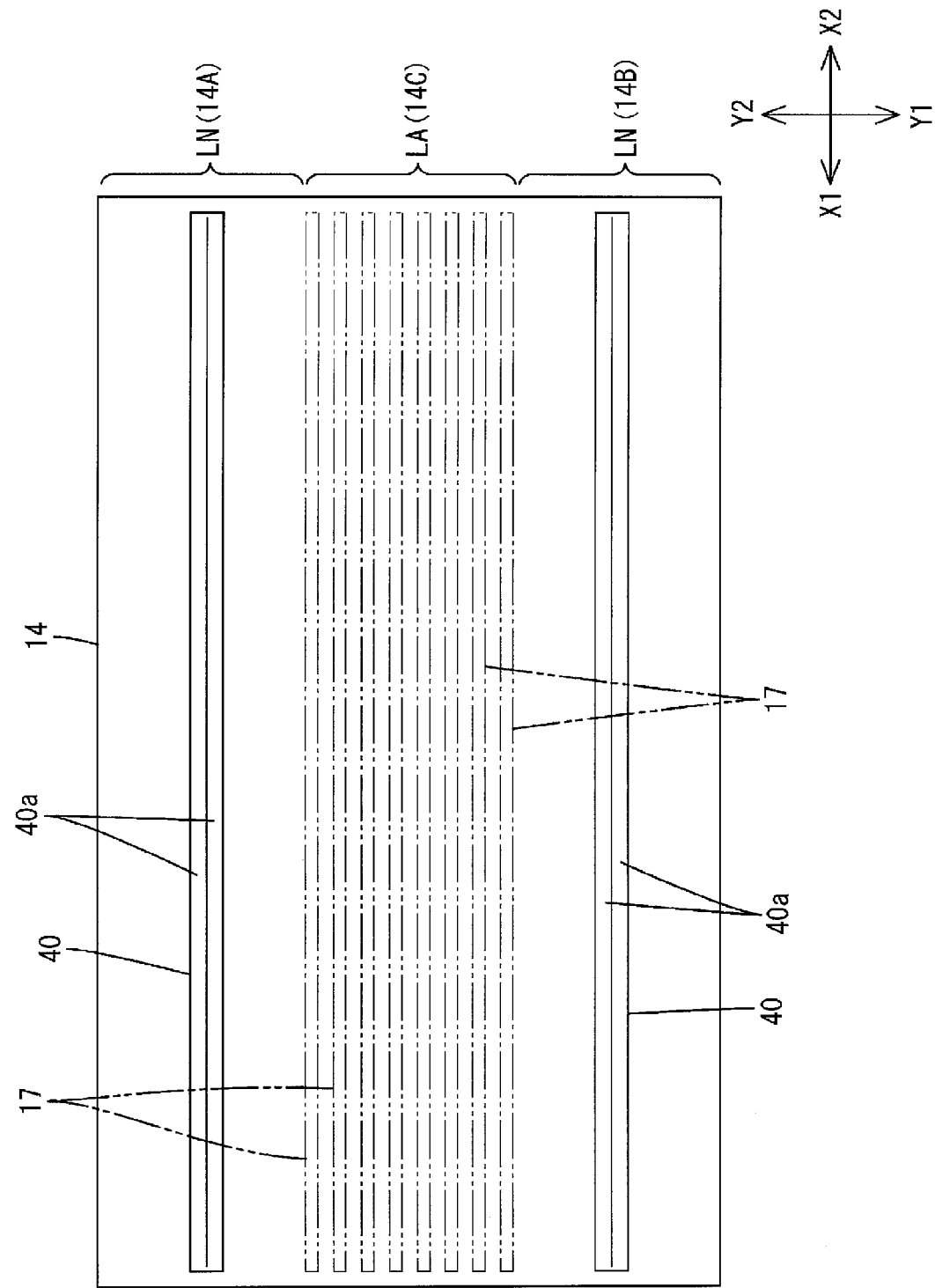
FIG. 19 is a plan view illustrating an arrangement of cold cathode tubes and a chassis provided in the liquid crystal display device.
Figure 20:
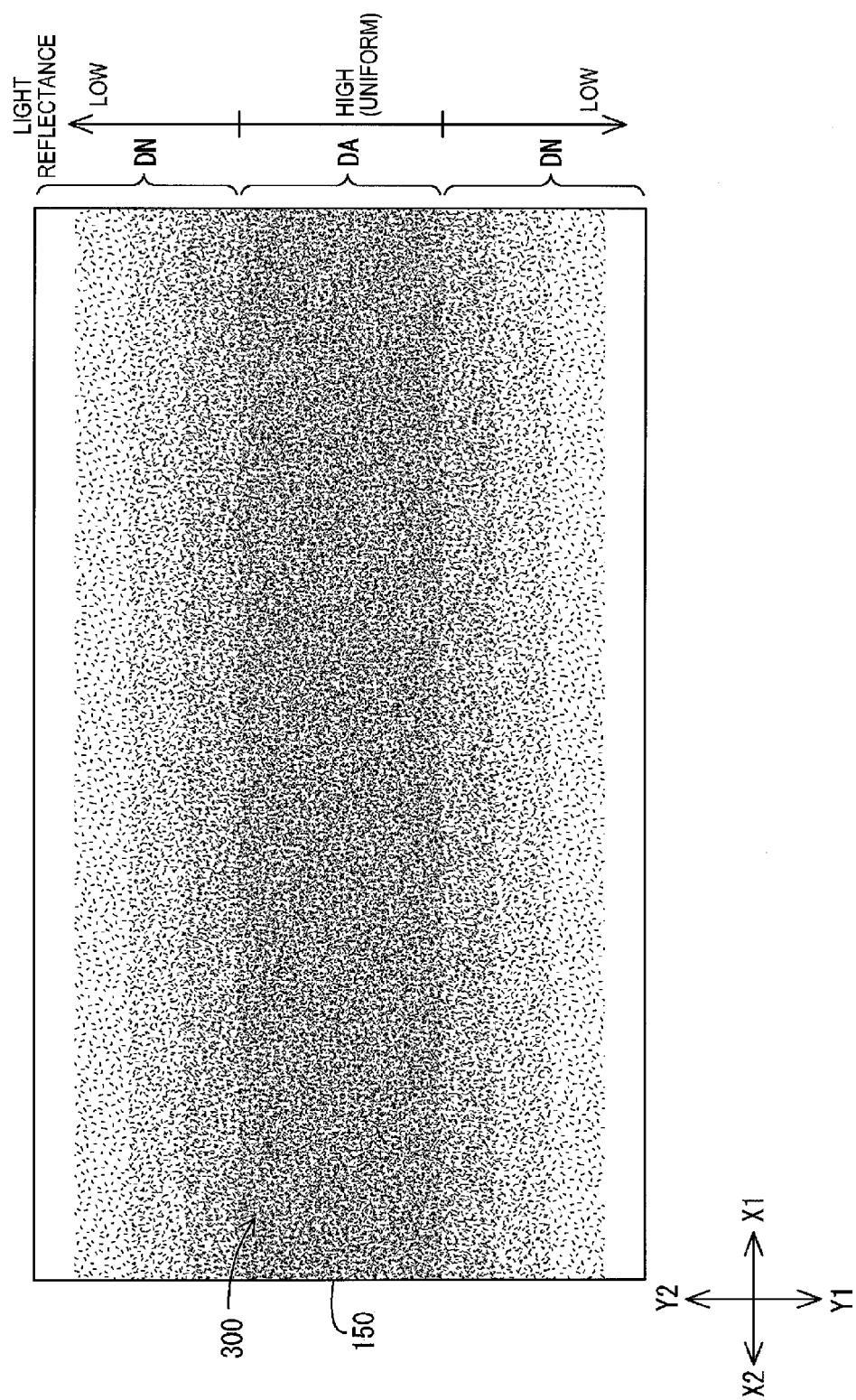
FIG. 20 is a plan view explaining a light reflectance distribution on a surface of the diffuser plate.
Figure 21:
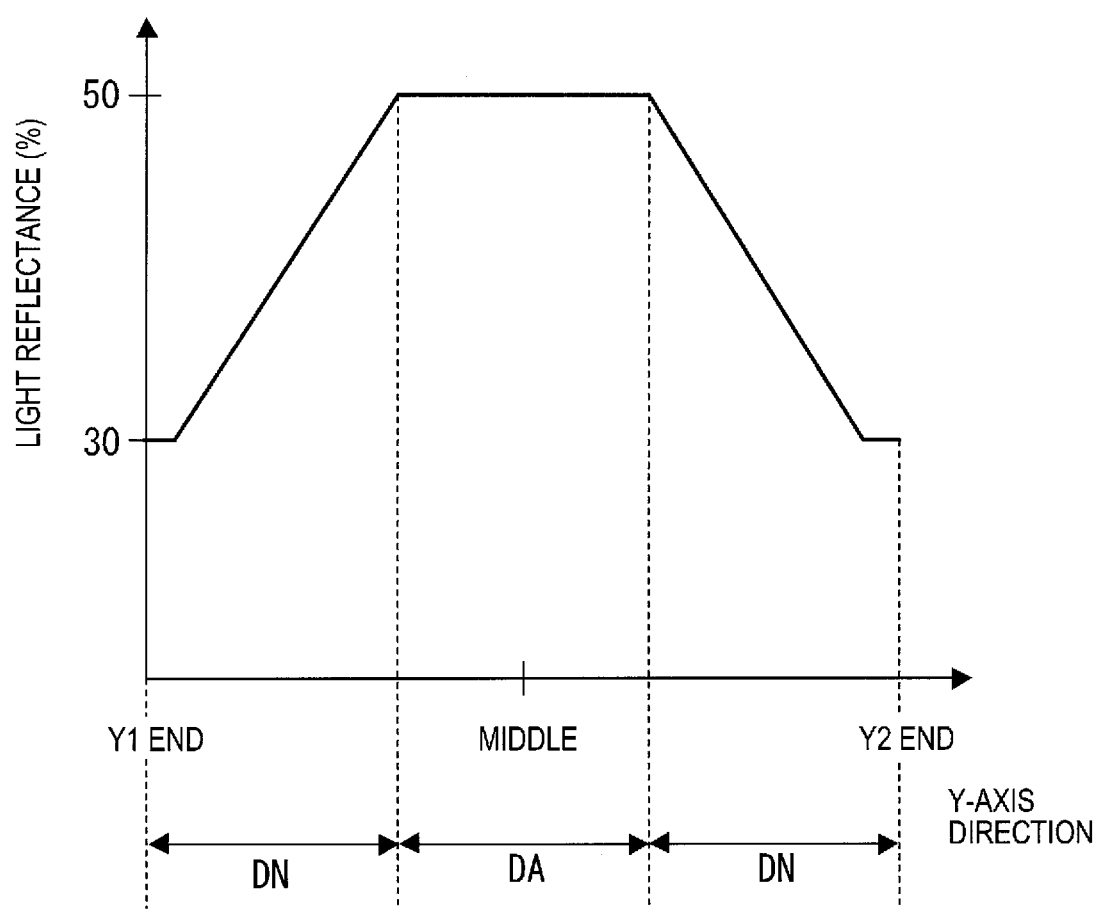
FIG. 21 is a graph illustrating a light reflectance change in the short-side direction of the diffuser plate.

FIG. 17 is an exploded perspective view illustrating a construction of a liquid crystal display device. FIG. 18 is a cross-sectional view of the liquid crystal display device of FIG. 17 along the short-side direction. FIG. 19 is a plan view illustrating a general construction of a chassis provided in the liquid crystal display device in FIG. 17. FIG. 20 is a plan view explaining a light reflectance distribution on a surface of the diffuser plate provided in the liquid crystal display device in FIG. 17. FIG. 21 is a graph illustrating a light reflectance change in the short-side direction of the diffuser plate in FIG. 20. In FIG. 20, a long-side direction of the diffuser plate represents the X-axis direction and a short-side direction of the diffuser plate represents the Y-axis direction. In FIG. 21, a horizontal axis represents the Y-axis direction (short-side direction) and the light reflectance is plotted on a graph from the end closer to the Y1 (Y1 end) to the middle portion and from the middle portion to the end closer to the Y2 (Y2 end) in the Y-axis direction.

Each cold cathode tube 17 has an elongated tubular shape. A plurality of the cold cathode tubes 17 are installed in the chassis 14 such that they are arranged parallel to each other with the long-side direction (axial direction) thereof aligned along the long-side direction of the chassis 14. Specifically, as illustrated in FIGS. 17 to 19, the bottom plate 14a of the chassis 14 (a portion facing the diffuser plate 150) is equally divided in the short-side direction into a first end portion 14A, a second end portion 14B and a middle portion 14C. The second end portion 14B is located at an end away from the first end portion 14A. The middle portion 14C is located between the first and second end portions 14A, 14B. The cold cathode tubes 17 are arranged in the middle portion 14C of the bottom plate 14a and a light source installation area LA is formed here. No cold cathode tube 17 is arranged in the first end portion 14A and the second end portion 14B of the bottom plate 14a, and empty areas LN are formed there. Namely, the cold cathode tubes 17 are arranged only in the middle portion, which is located around the middle of the bottom plate 14a of the chassis 14 in the short-side direction to form the light source installation area LA. The light source installation area LA is smaller than (a half of) each empty area LN. In the present embodiment, each of the first end portion 14A, the second end portion 14B and the middle portion 14C has an equal area (is equally defined). However, a ratio between the portions can be changed and accordingly, the area of the light source installation area LA and the area of the empty areas LN (an area ratio between the areas LA and LN) also can be changed. The lamp clips 18 holding the cold cathode tubes 17 are provided only in the light source installation area LA of the bottom plate 14a of the chassis 14. An inverter board 28 that supplies drive power to the cold cathode tubes 17 is provided on an outer surface of the bottom plate 14a of the chassis 14 that overlaps the light source installation area LA.

In each of the empty areas LN of the bottom plate 14a of the chassis 14, that is, in each of the first end portion 14A and the second end portion 14B of the bottom plate 14a, a convex reflecting portion (reflecting portion) 40 extends along the long-side direction of the bottom plate 14a. The convex reflecting portion 40 is made of a synthetic resin and has a surface in white color that provides high light reflectivity. Each convex reflecting portion 40 has two sloped surfaces (directing surfaces) 40 that face the cold cathode tubes 17 and are sloped toward the bottom plate 14a. The convex reflecting portion 40 is provided such that its longitudinal direction matches an axial direction of the cold cathode tubes 17 arranged in the light source installation area LA. One sloped surface 40a of the convex reflecting portion 40 directs light emitted from the cold cathode tubes 17 to the diffuser plate 150.

The diffuser plate 150 has a long-side direction (X-axis direction) and a short-side direction (Y-axis direction). The light reflectance of a first surface 150a of the diffuser plate 150 facing the cold cathode tubes 17 changes along the short-side direction by changing the dot pattern of the light reflecting portion 300 as illustrated in FIGS. 20 and 21. In other words, on the first surface 150a of the diffuser plate 150, the light reflectance of the portion that overlaps the light source installation area LA (referred to as a light source overlapping surface area area DA) is higher than the light reflectance of the portion that overlaps the empty area LN (referred to as an empty area overlapping surface area area DN). More specifically, in the light source overlapping surface area area DA of the diffuser plate 150, the light reflectance is uniform to be 50% and represents a maximum value on the diffuser plate 150. On the other hand, in the empty area overlapping surface area area DN of the diffuser plate 150, the light reflectance decreases in a continuous and gradual manner from the portion closer to the light source overlapping surface area DA toward the portion away from the light source overlapping surface area DA. The light reflectance is set to a lowest value that is 30% at two end portions (Y1 end and Y2 end in FIG. 21) of the empty area overlapping surface area DN in the short-side direction (Y-axis direction).

A distribution of light reflectance of the diffuser plate 150 is determined by an area of each dot of the light reflecting portion 300. The light reflectance of the light reflecting portion 300 is higher than the light reflectance of the diffuser plate 150. Therefore, the light reflectance relatively increases by relatively increasing the area occupied by the dots of the light reflecting portion 300 and the light reflectance relatively reduces by relatively reducing the area occupied by the dots of the light reflecting portion 300. Specifically, in the light source overlapping surface area DA of the diffuser plate 150, the area occupied by the dots of the light reflecting portion 300 is relatively large and uniform. The area occupied by the dots of the light reflecting portion 300 is continuously reduced from a border between the light source overlapping surface area DA and the empty area overlapping surface area DN toward the two end portions of the empty area overlapping surface area DN in the short-side direction. As control means for controlling the light reflectance, the area of each dot of the light reflecting portion 300 may be set to be same and a distance between the dots may be changed.

As is explained above, according to the present embodiment, the chassis 14 included in the backlight device 12 is configured such that the bottom plate 14a facing the diffuser plate 150 is defined in the first end portion 14A, the second end portion 14B and the middle portion 14C sandwiched between the first and second end portions 14A, 14B. The middle portion 14C corresponds to the light source installation area LA where the cold cathode tubes 17 are arranged and the first end portion 14A and the second end portion 14B correspond to the empty areas LN where no cold cathode tube 17 is arranged. Thus, compared to a case in which the cold cathode tubes are installed evenly in the entire chassis, the number of cold cathode tubes 17 is reduced and a cost reduction and power saving of the backlight device 12 are achieved.

On the surface of the diffuser plate 150 facing the cold cathode tubes 17, the light reflectance of the light source overlapping surface area DA that overlaps the light source installation area LA is higher than the light reflectance of the empty area overlapping surface area DN that overlaps the empty area LN. Brightness nonuniformity of illumination light is less likely to be caused in the backlight device 12.

As described above, if the empty area LN where no cold cathode tube 17 is arranged is provided, light is not output from the empty area LN. Therefore, the illumination light output from the backlight device 12 is dark at the portion corresponding to the empty area LN and this may cause uneven brightness. However, according to the configuration of the present embodiment, light output from the light source installation area LA first reaches the light source overlapping surface area DA of the diffuser plate 15a0 that is the portion having the relatively high light reflectance. Therefore, most of the light reflects off the light source overlapping surface area DA (does not pass through the light source overlapping surface area DA), and the brightness of illumination light is suppressed with respect to the light emission amount from the cold cathode tubes 17. On the other hand, the light that reflects off the light source overlapping surface area DA further reflects off the reflecting sheet 23 and the like in the chassis 14 and reaches the empty area overlapping surface area DN of the diffuser plate 150. The light reflectance of the empty area overlapping surface area DN is relatively low and a larger amount of light passes through the empty area overlapping surface area DN and thus predetermined brightness of illumination light is achieved. As a result, the backlight device 12 can provide uniform illumination light brightness.

Thus, the light emitted from the cold cathode tubes 17 in the light source installation area LA is reflected in the chassis 14 by the portion (light source overlapping surface area DA) of the diffuser plate 150 having relatively high light reflectance so as to be introduced to the empty area LN. Also, the light reflectance of the empty area overlapping surface area DN corresponding to the empty area LN is relatively low. Therefore, the illumination light can be output from the empty area LN where no cold cathode tube 17 is arranged. As a result, the cold cathode tubes 17 are not necessary to be installed in the entire chassis 14 to maintain the illumination light uniformity of the backlight device 12, and a cost reduction and power saving are achieved.

The configuration of the present embodiment is effective especially for the thin backlight device 12 of the present embodiment to suppress the brightness nonuniformity. In the thin backlight device 12, a distance between the cold cathode tubes 17 and the diffuser plate 150 is small and a lamp image may be visible. To suppress the generation of the lamp image, the cold cathode tubes have been tightly installed (that is, a plurality of cold cathode tubes have been installed), and this increases a cost. However, according to the configuration of the present embodiment, it is needless to say that no lamp image is occurred in the empty area LN. Further, in the light source installation area LA, a relatively large amount of the linear light emitted from the cold cathode tubes 17 is reflected by the portion of the diffuser plate 150 having relatively high light reflectance (light source overlapping surface area DA). Therefore, the linear light is less likely to pass through the diffuser plate 150 and a lamp image is less likely to be generated. As a result, in the thin backlight device 12, without increasing the number of cold cathode tubes 17 or with the decreased number of the cold cathode tubes 17, generation of lamp images is suppressed and a cost reduction and illumination having uniform brightness are achieved.

In the present embodiment, the light reflectance of the first surface 150a of the diffuser plate 150 facing the cold cathode tubes 17 is constant in a portion that overlaps the light source installation area LA (the light source overlapping surface area DA). With such a configuration, rays of light emitted from the cold cathode tubes 17 in the light source installation area LA reflect off (transmit through) the diffuser plate 150 evenly. Therefore, uniform illumination light is obtained easily in the light source installation area LA.

In the present embodiment, on the bottom plate 14a of the chassis 14, the light source installation area LA is smaller than the empty areas LN. Even if the light source installation area LA is relatively small, by changing the light reflectance of the diffuser plate 150 in its surface like the configuration of the present embodiment, rays of light emitted from the cold cathode tubes 17 can be directed toward the empty areas LN inside the chassis 14. This maintains uniformity of illumination brightness and greater effects can be expected in lowering a cost and saving power.

In the present embodiment, the light source installation area LA is provided in the middle portion 14C of the bottom plate 14a of the chassis 14. With such a configuration, sufficient brightness is ensured at the middle portion of the backlight device 12 and the brightness at the middle portion of a display is ensured in the television receiver TV including the backlight device 12, and therefore good visibility can be obtained.

In the present embodiment, the light reflectance of a surface of the portion of the diffuser plate 150 facing the cold cathode tubes 17 that overlaps the empty area (empty area overlapping surface area DN) is higher in a portion closer to the portion of the diffuser plate 150 that overlaps the light source installation area LA (light source overlapping surface area DA) than in a portion farther from the light source overlapping surface area DA. With such a configuration, the light that reaches the empty area overlapping surface area DN of the diffuser plate 150 is relatively easily reflected in the portion closer to the light source overlapping surface area DA and the reflected light reaches the portion farther from the light source overlapping surface area DA. In the portion away from the light source overlapping surface area DA, the light reflectance is relatively low and therefore, a larger amount of light passes therethrough and predetermined brightness of illumination light can be obtained. Therefore, the brightness of illumination light is set to substantially uniform in the empty area overlapping surface area DN (empty area LN) and a moderate distribution of illumination brightness can be achieved in the backlight device 12.

Especially in the present embodiment, the light reflectance in the empty area overlapping surface area DN of the diffuser plate 150 decreases in a gradual and continuous manner from the portion closer to the light source overlapping surface area DA to the portion away from the light source overlapping surface area DA. The light reflectance in the empty area overlapping surface area DN decreases in a gradual and continuous manner from the portion closer to the light source overlapping surface area DA to the portion away therefrom so as to have a gradation. This makes the distribution of illumination light brightness in the empty area overlapping surface area DN (empty area LN) to be further moderate and the backlight device 12 can achieve a further moderate distribution of illumination light brightness.

The second embodiment of the present invention has been described, however, the present invention is not limited to the above embodiments explained in the above description and the drawings. The following modifications may be included in the technical scope of the present invention, for example. The same parts as the above embodiments are indicated by the same symbols and will not be illustrated in drawings and will not be explained.

[First Modification of Second Embodiment]

Figure 22:
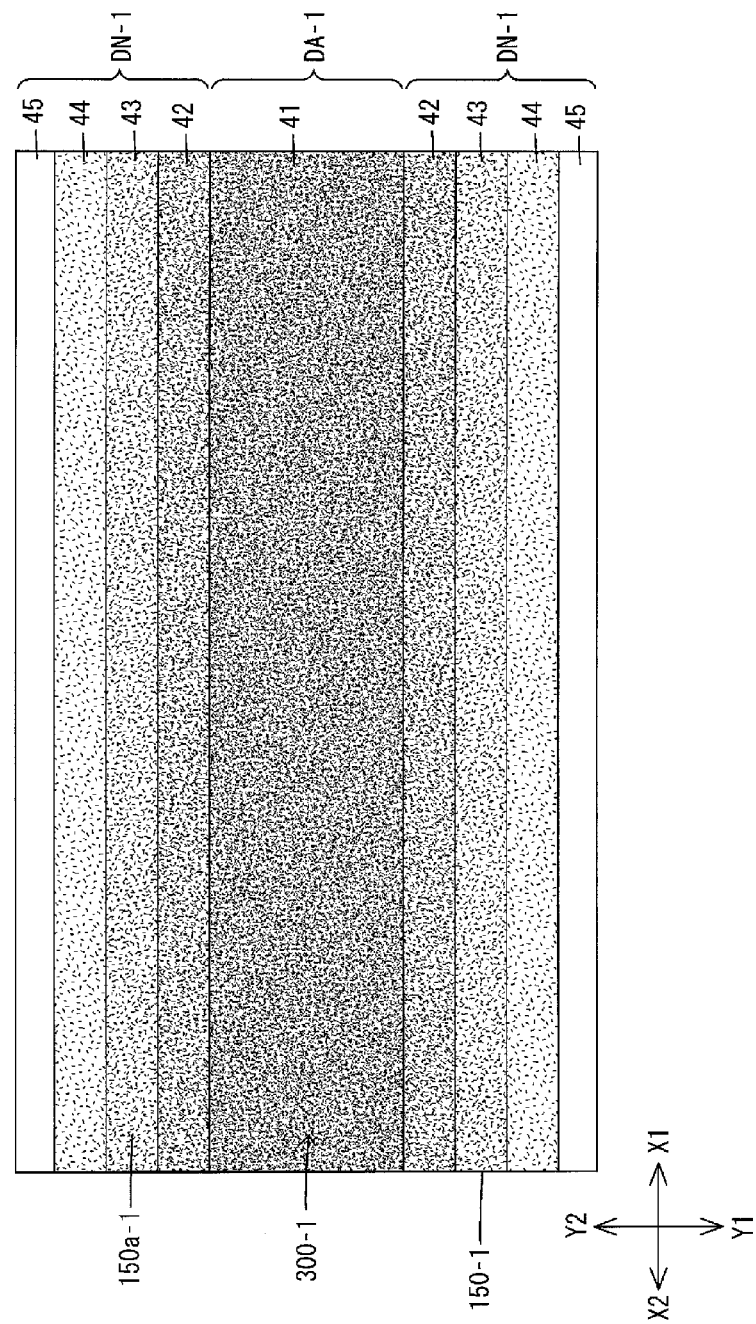
FIG. 22 is a plan view explaining a light reflectance distribution on a surface of a diffuser plate according to a first modification of the second embodiment.

A first modification of the backlight device 12 of the second embodiment will be explained with reference to FIGS. 22 and 23. An arrangement of a light reflecting portion 300-1 on a first surface 150a-1 of a diffuser plate 150-1 is altered from that in the second embodiment. FIG. 22 is a plan view illustrating a light reflectance distribution on a surface of a diffuser plate according to the first modification. FIG. 22 is a graph illustrating a light reflectance change in the short-side direction of the diffuser plate.

Figure 23:
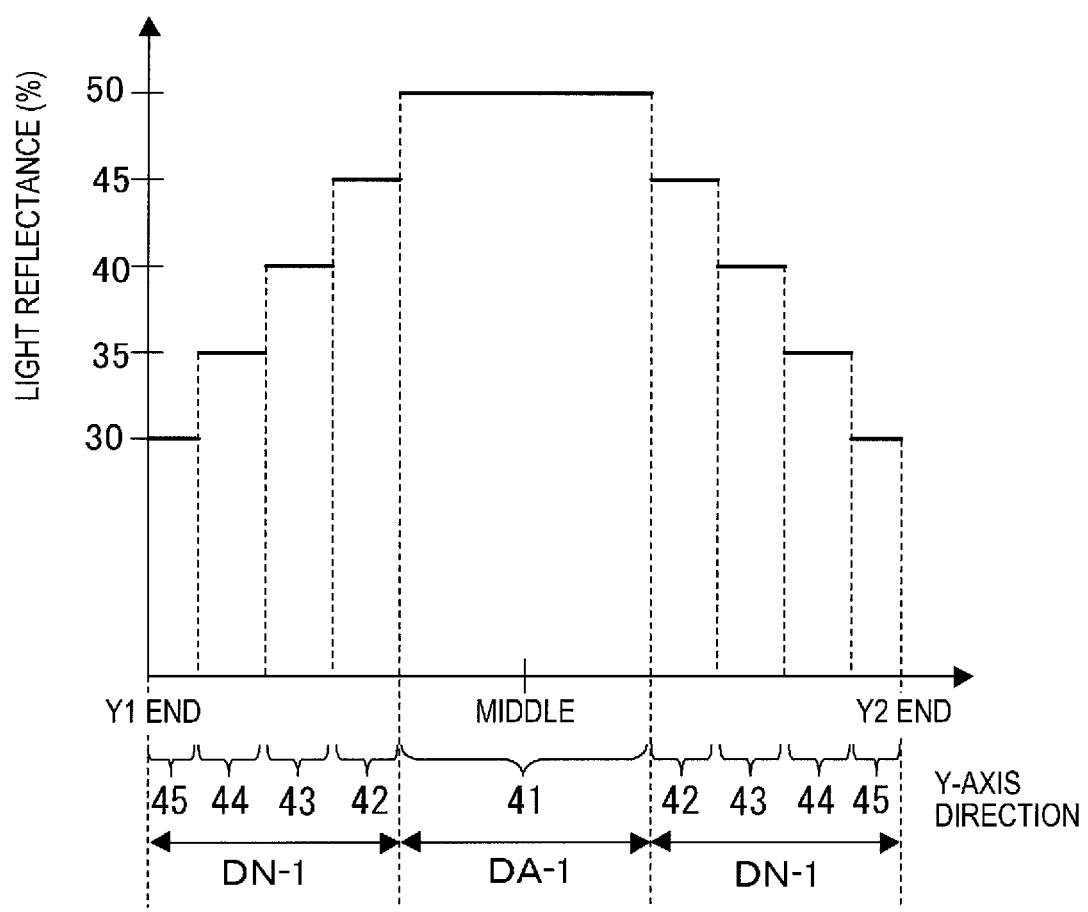
FIG. 23 is a graph illustrating a light reflectance change in the short-side direction of the diffuser plate in FIG. 22.

As illustrated in FIGS. 22 and 23, the light source overlapping surface area DA-1 of a diffuser plate 150-1 (a surface of the portion that overlaps the light source installation area LA-1 facing the cold cathode tubes 17) has the highest light reflectance, and in the empty area overlapping surface area DN-1 of the diffuser plate 150-1 (a surface of the portion that overlaps the empty area LN facing the cold cathode tubes 17), the light reflectance decreases in a stepwise and gradual manner from the portion closer to the light source overlapping surface area DA-1 toward the portion farther therefrom. Namely, in the empty area overlapping surface area DN-1 of the diffuser plate 150-1, the light reflectance changes in a stripe along the short-side direction (Y-axis direction) of the diffuser plate 150-1. More specifically, as illustrated in FIG. 22, a first area 41 having relatively high light reflectance is provided in the light source overlapping surface area DA-1 that is located in the middle portion of the diffuser plate 150-1, and second areas 42, 42 having light reflectance relatively lower than the first area 41 are provided next to the first area 41 in the empty area overlapping surface area DN-1 located at the sides of the first area 41. Further, in the empty area overlapping surface area DN-1, third areas 43, 43 having light reflectance relatively lower than the second areas 52 are provided at the sides of the second areas 42, fourth areas 44, 44 having light reflectance lower than the third areas 43 are provided at the sides of the third areas 43, and fifth areas 45, 45 having light reflectance lower than the fourth areas 44 are provided at the sides of the fourth areas 44.

In this modification, as illustrated in FIG. 23, the light reflectance of the diffuser plate 150-1 is 50% in the first area, 45% in the second area, 40% in the third area, 35% in the fourth area, and 30% in the fifth area and it changes with equal ratio. In the first to fourth areas, the area occupied by the dots of the light reflecting portion 300-1 is changed to determine the above light reflectance, and the light reflectance in the fifth area in which no light reflecting portion 300-1 is provided is represented by the light reflectance of the diffuser plate 150-1.

A plurality of areas 42, 43, 44, 45 having different light reflectance are defined in the empty area overlapping surface area DN-1 of the diffuser plate 150-1. The light reflectance is reduced from the second area 42 to the fifth area 45 sequentially in this order such that the light reflectance decreases in a stepwise manner from the portion closer to the light source overlapping surface area DA-1 toward the portion farther therefrom.

According to such a configuration, the brightness distribution of illumination light in the empty area overlapping surface area DN-1 (empty area LN) is made moderate and the backlight device 12 can obtain a moderate illumination brightness distribution. With the means for forming a plurality of areas 42, 43, 44, 45 having different light reflectance, a manufacturing method of the diffuser plate 150-1 becomes simple and this contributes to a cost reduction.

[Second Modification of Second Embodiment]

Figure 24:
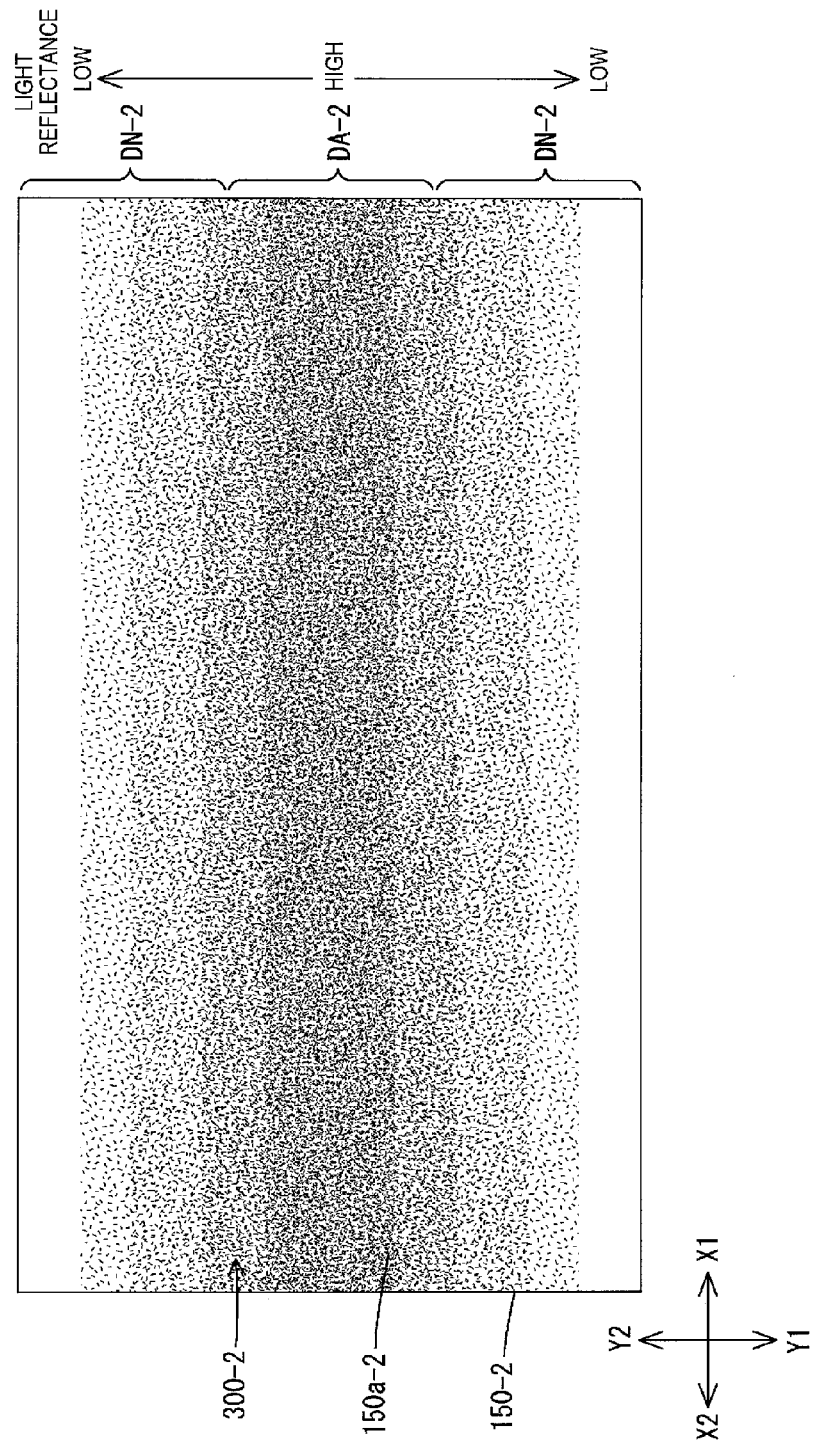
FIG. 24 is a plan view explaining a light reflectance distribution on a surface of a diffuser plate according to a second modification of the second embodiment.
Figure 25:
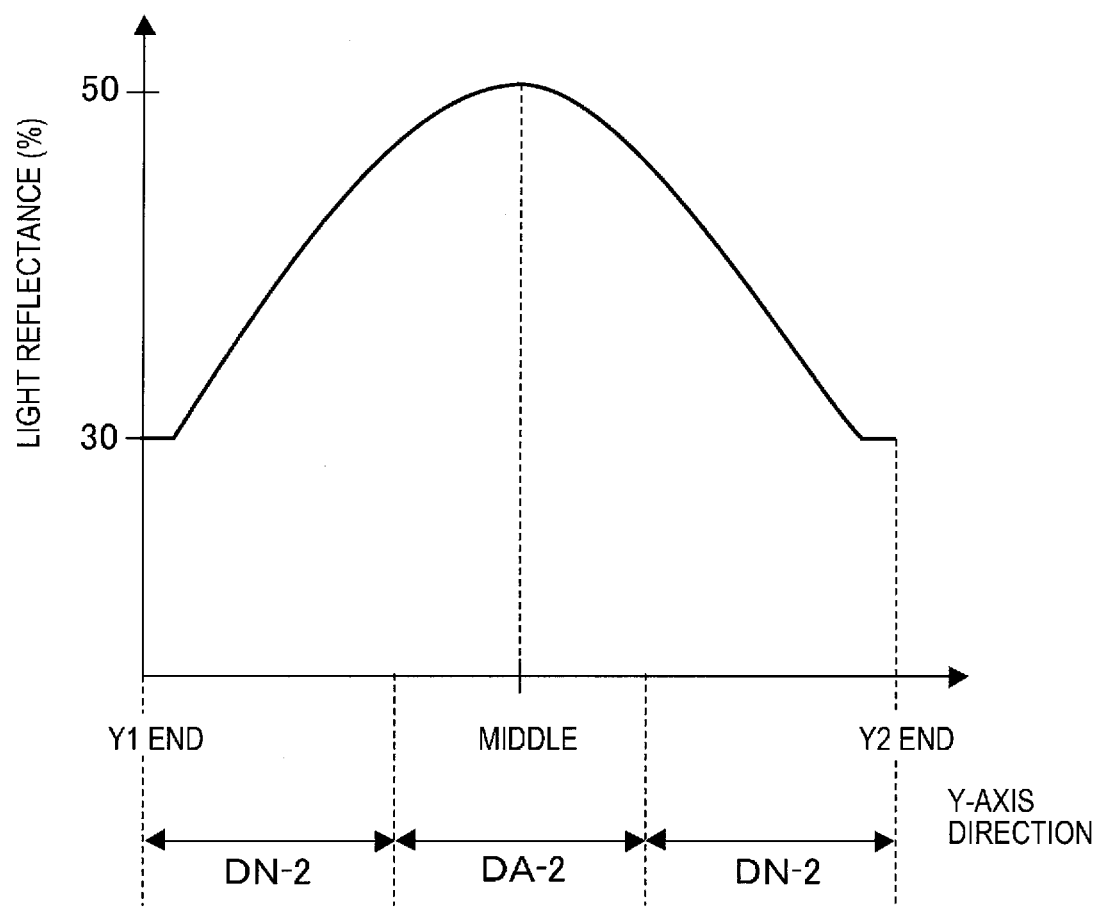
FIG. 25 is a graph illustrating a light reflectance change in the short-side direction of the diffuser plate in FIG. 24.

A second modification of the backlight device 12 according to the second embodiment will be explained with reference to FIGS. 24 and 25. An arrangement of a light reflecting portion 300-2 on a first surface 150a-2 of a diffuser plate 150-2 is altered. FIG. 24 is a plan view illustrating a distribution of light reflectance of a surface of the diffuser plate according to the second modification. FIG. 25 is a graph illustrating a reflectivity change in the short-side direction of the diffuser plate.

As illustrated in FIGS. 24 and 25, a diffuser plate 150-2 is configured such that the light reflectance is lower at the ends than the middle portion in its short-side direction (Y-axis direction). Namely, in the entire diffuser plate 150-2, the light reflectance of the light source overlapping surface area DA-2 (a surface of the portion that overlaps the light-source installation area LA facing the cold cathode tubes 17) that is located at its middle portion is relatively higher than the light reflectance of the empty area overlapping surface area DN-2 (a surface of the portion that overlaps the empty area LN facing the cold cathode tubes 17). Further, also in the light source overlapping surface area DA-2 and the empty area overlapping surface area DN-2, the light reflectance reduces from the middle portion toward the ends of the diffuser plate 150-2.

In this modification, as illustrated in FIG. 25, the light reflectance of the diffuser plate 150-2 is 50% at the middle portion and 30% at the Y1 end and the Y2 end, and it continuously changes from 50% to 30% from the middle portion to the ends.

According to such a configuration, the distribution of illumination light brightness in the entire diffuser plate 150-2 can be moderate and accordingly the backlight device 12 can obtain the moderate distribution of illumination light brightness. Such a configuration is especially preferable for the television receiver TV including the backlight device 12 that has high brightness in the vicinity of the middle portion of the display.

[Third Modification of Second Embodiment]

Figure 26:
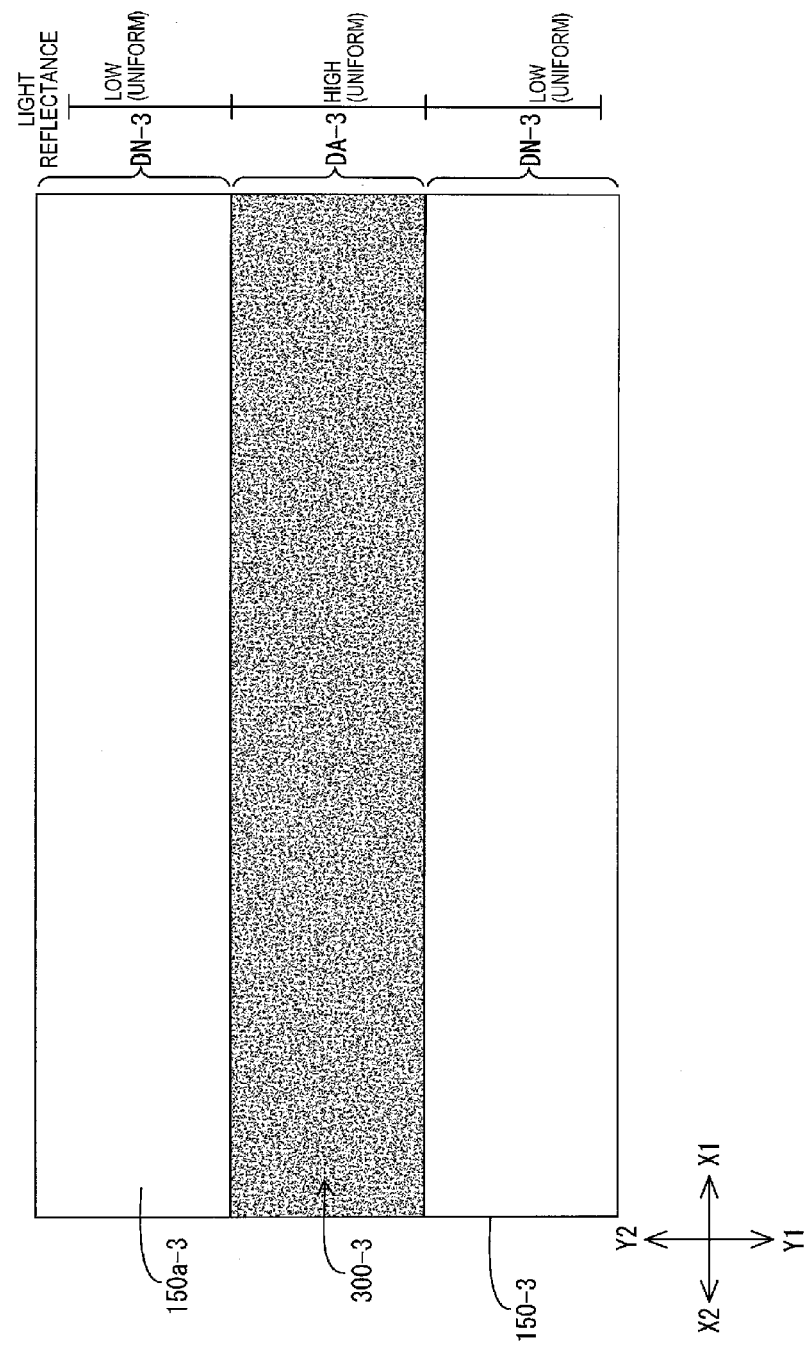
FIG. 26 is a plan view explaining a light reflectance distribution on a surface of a diffuser plate according to a third modification of the second embodiment.
Figure 27:
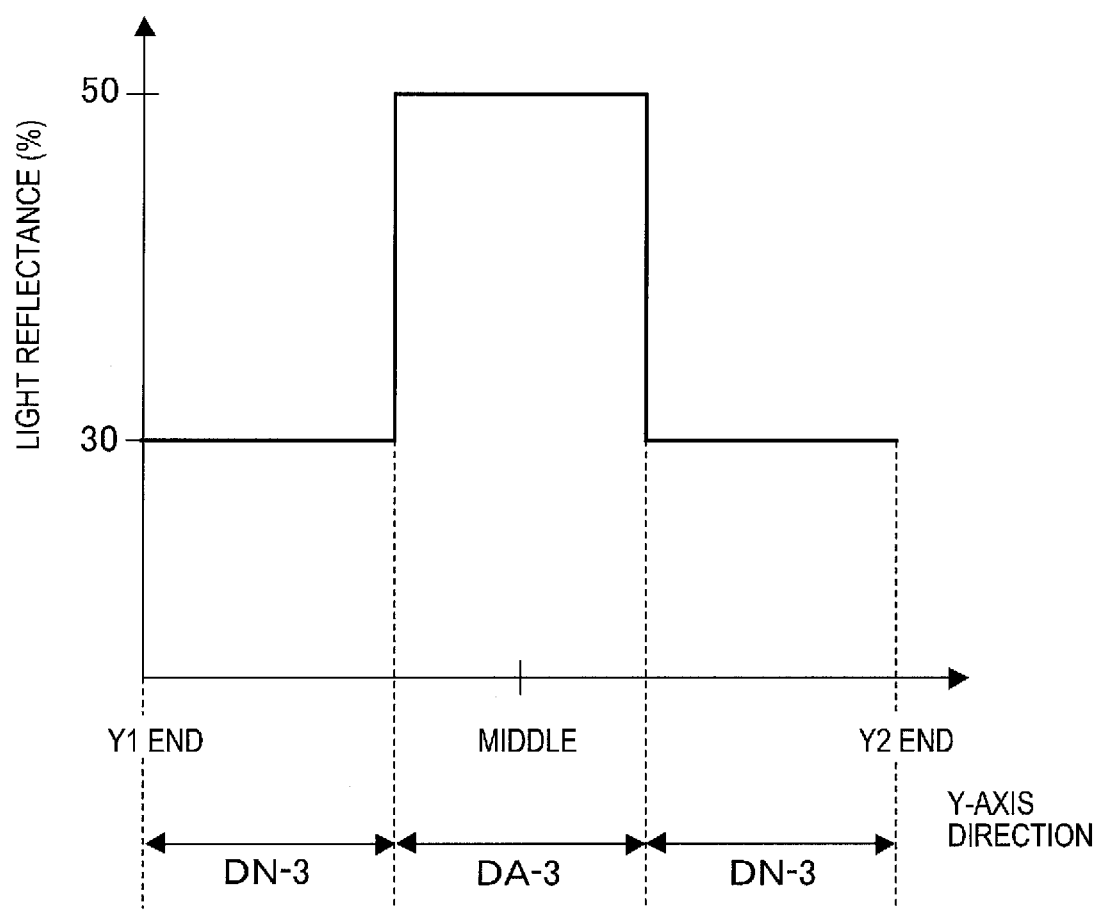
FIG. 27 is a graph illustrating a light reflectance change in the short-side direction of the diffuser plate in FIG. 26.

A third modification of the backlight device 12 according to the second embodiment will be explained with reference to FIGS. 26 and 27. An arrangement of a light reflecting portion 300-3 on a first surface 150a-3 of a diffuser plate 150-3 is modified from the second embodiment. FIG. 26 is a plan view illustrating a light reflectance distribution of a surface of the diffuser plate according to the third modification. FIG. 27 is a graph illustrating a reflectivity change in the short-side direction of the diffuser plate in FIG. 26.

In the diffuser plate 150-3, as illustrated in FIGS. 26 and 27, the light source overlapping surface area DA-3 (a surface of the portion that overlaps the light source installation area LA facing the cold cathode tubes 17) has relatively high light reflectance, and the empty area overlapping surface area DN-3 (a surface of the portion that overlaps the empty area LN facing the cold cathode tubes 17) has relatively low light reflectance. Further, the light reflectance is uniform in the light source overlapping surface area DA-3 and in the empty area overlapping surface areas DN-3. In this modification, the light reflectance of the diffuser plate 150-3 is 50% in the light source overlapping surface area DA-3 that is located in the middle portion, and 30% in the empty area overlapping surface areas DN-3 that are located at the ends as illustrated in FIG. 27.

The distribution of the light reflectance of the diffuser plate 150-3 is obtained by forming the light reflecting portion 300-3 as follows. The area occupied by the dots of the light reflecting portion 300-3 are relatively increased in the light source overlapping surface area DA-3 and the area occupied by the dots is uniform within the light source overlapping surface area DA-3. On the other hand, the area occupied by the dots of the light reflecting portion 300-3 is relatively reduced in the empty area overlapping surface area DN-3 and the area occupied by the dots is uniform within the empty area overlapping surface area DN-3.

Another example of the light reflecting portion 300-3 will be described below. The light reflecting portion 300-3 where the area occupied by the dots is uniform is formed in the light source overlapping surface area DA-3. On the other hand, in the empty area overlapping surface areas DN-3, no light reflecting portion 300-3 is formed and a surface of the diffuser plate 150-3 is exposed in an entire surface of the empty area overlapping surface areas DN-3. Accordingly, relatively low and uniform light reflectance is obtained in the empty area overlapping surface areas DN-3.

According to such a configuration, the light reflecting portion 300-3 is formed only in the middle portion of the diffuser plate 150-3 and this simplifies a manufacturing method of the diffuser plate 150-3 and contributes to a cost reduction.

[Fourth Modification of Second Embodiment]

Figure 28:
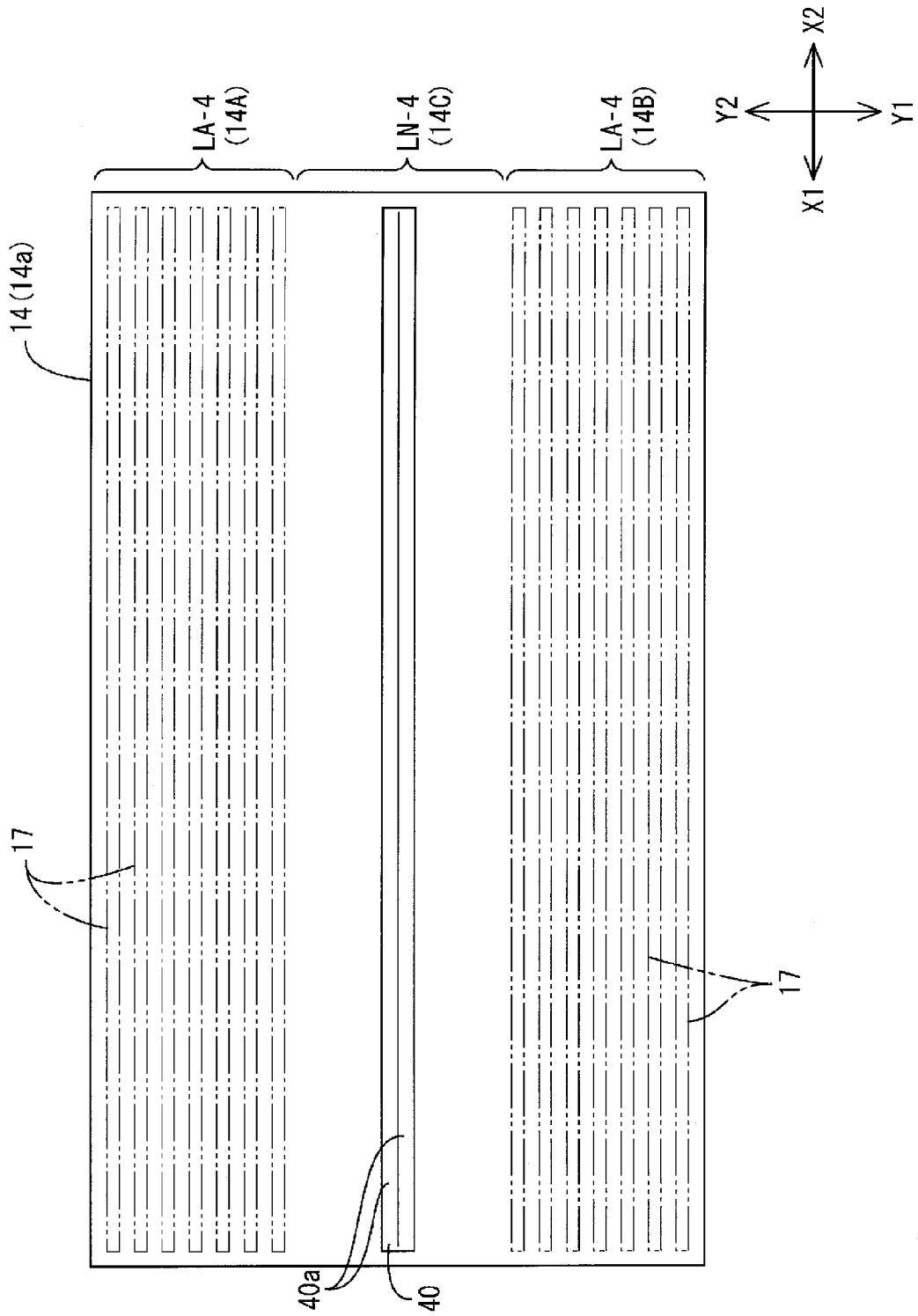
FIG. 28 is a plan view illustrating an arrangement of cold cathode tubes and a chassis provided in a backlight device according to a fourth modification of the second embodiment.
Figure 29:
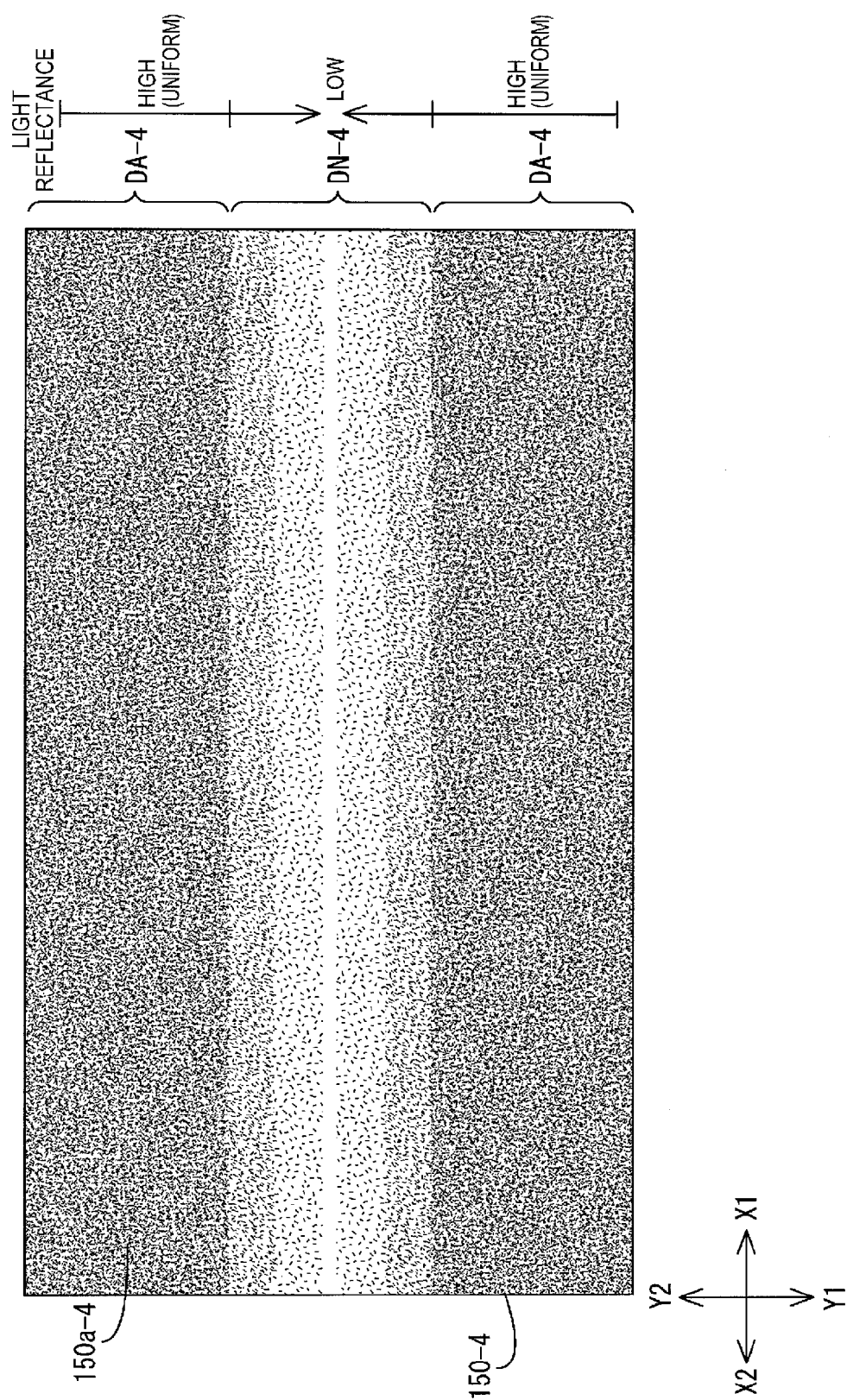
FIG. 29 is a plan view illustrating a light reflectance distribution on a surface of the diffuser plate in FIG. 28.
Figure 30:
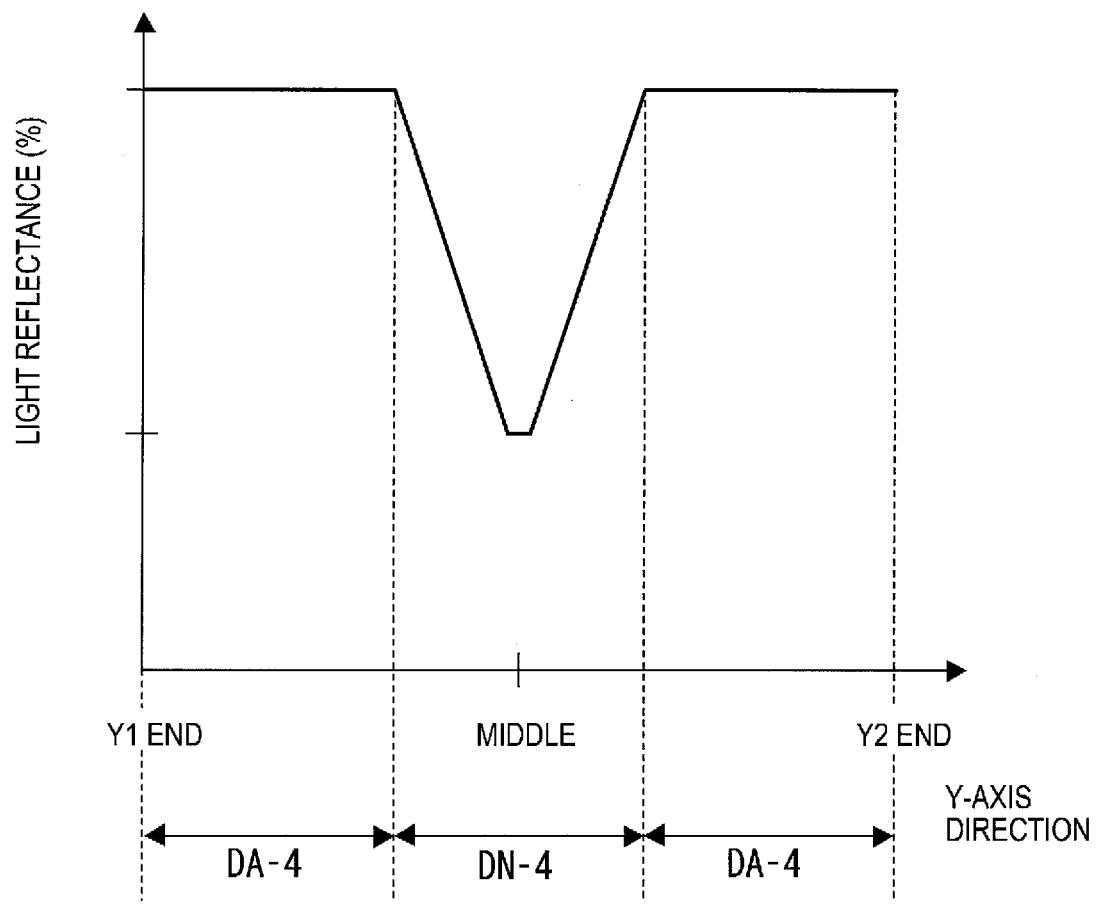
FIG. 30 is a graph illustrating a light reflectance change in the short-side direction of the diffuser plate in FIG. 29.

Next, a fourth modification of the backlight device 12 according to the second embodiment will be explained with reference to FIGS. 28 to 30. In the fourth modification, the arrangement of the cold cathode tubes 17 and the distribution of light reflectance of a diffuser plate 150-4 are modified. FIG. 28 is a plan view illustrating a general construction of a chassis according to the fourth modification. FIG. 29 is a plan view illustrating a distribution of light reflectance of a surface of the diffuser plate. FIG. 30 is a graph illustrating a light reflectance change in the short-side direction of the diffuser plate.

The cold cathode tubes 17 housed in a portion within the chassis 14 are arranged as follows. As illustrated in FIG. 28, a bottom plate 14a of the chassis 14 (a portion facing a diffuser plate 150-4) is defined in the short-side direction in a first end portion 14A, a second end portion 14B that is located at an end opposite from the first end portion 14A and a middle portion 14C that is sandwiched between the first end portion 14A and the second end portion 14B. The same number of cold cathode tubes 17 are arranged in the first end portion 14A and the second end portion 14B of the bottom plate 14a respectively and a light source installation area LA-4 is formed in the first end portion 14A and the second end portion 14B. On the other hand, no cold cathode tube 17 is arranged in the middle portion 14C of the bottom plate 14a and an empty area LN-4 is formed in the middle portion 14C. Namely, the cold cathode tubes 17 are arranged in the two end portions of the bottom plate 14a of the chassis 14 in the short-side direction to form the light source installation areas LA-4.

The light reflectance of the first surface 150a-4 of the diffuser plate 150-4 facing the cold cathode tubes 17 changes in the short-side direction of the diffuser plate 150-4 as illustrated in FIGS. 29 and 30. Namely, on the first surface 150a-4 of the diffuser plate 150-4, the light reflectance of the portion that overlaps the light source installation area LA-4 (referred to as the light source overlapping surface area DA-4 hereinafter) is higher than the light reflectance of the portion that overlaps the empty area LN-4 (referred to as the empty area overlapping surface area DN-4). More specifically, the light reflectance is 50% and uniform in the light source overlapping surface area DA-4 of the diffuser plate 150-4 and it is a maximum value in the diffuser plate 150-4. On the other hand, in the empty area overlapping surface area DN-4 of the diffuser plate 150-4, the light reflectance decreases in a continuous and gradual manner from the portion closer to the light source overlapping surface area DA-4 to the portion farther therefrom. The light reflectance is 30% that is a minimum value in the middle portion (center in FIG. 30) of the empty area overlapping surface area DN-4 in the short-side direction (Y-axis direction).

As is explained above, in this embodiment, the light source installation area LA-4 is provided in the first end portion 14A and the second end portion 14B of the bottom plate 14a, and the light reflectance of the portion of the diffuser plate 150-4 that overlaps the light source installation area LA-4 (light source overlapping surface area DA-4) is higher than the light reflectance of the portion that overlaps the empty area LN-4 (empty area overlapping surface area DN-4).

According to such a configuration, light emitted from the light source installation areas LA-4 that are provided at the ends of the chassis 14 first reaches the light source overlapping surface area DA-4 of the diffuser plate 150-4 that have relatively high light reflectance. Therefore, most of the light is reflected by the light source overlapping surface area DA-4 to the empty area LN-4. Therefore, the light enters the empty area LN-4 from the two ends thereof, and light is supplied to this area. Additionally, the light reflectance of the empty area overlapping surface area DN-4 facing the non-light installation area LN-4 is relatively low, and therefore a large amount of light passes therethrough. As a result, the empty area LN-4 is reliably prevented from being darkened.

[Fifth Modification of Second Embodiment]

Figure 31:
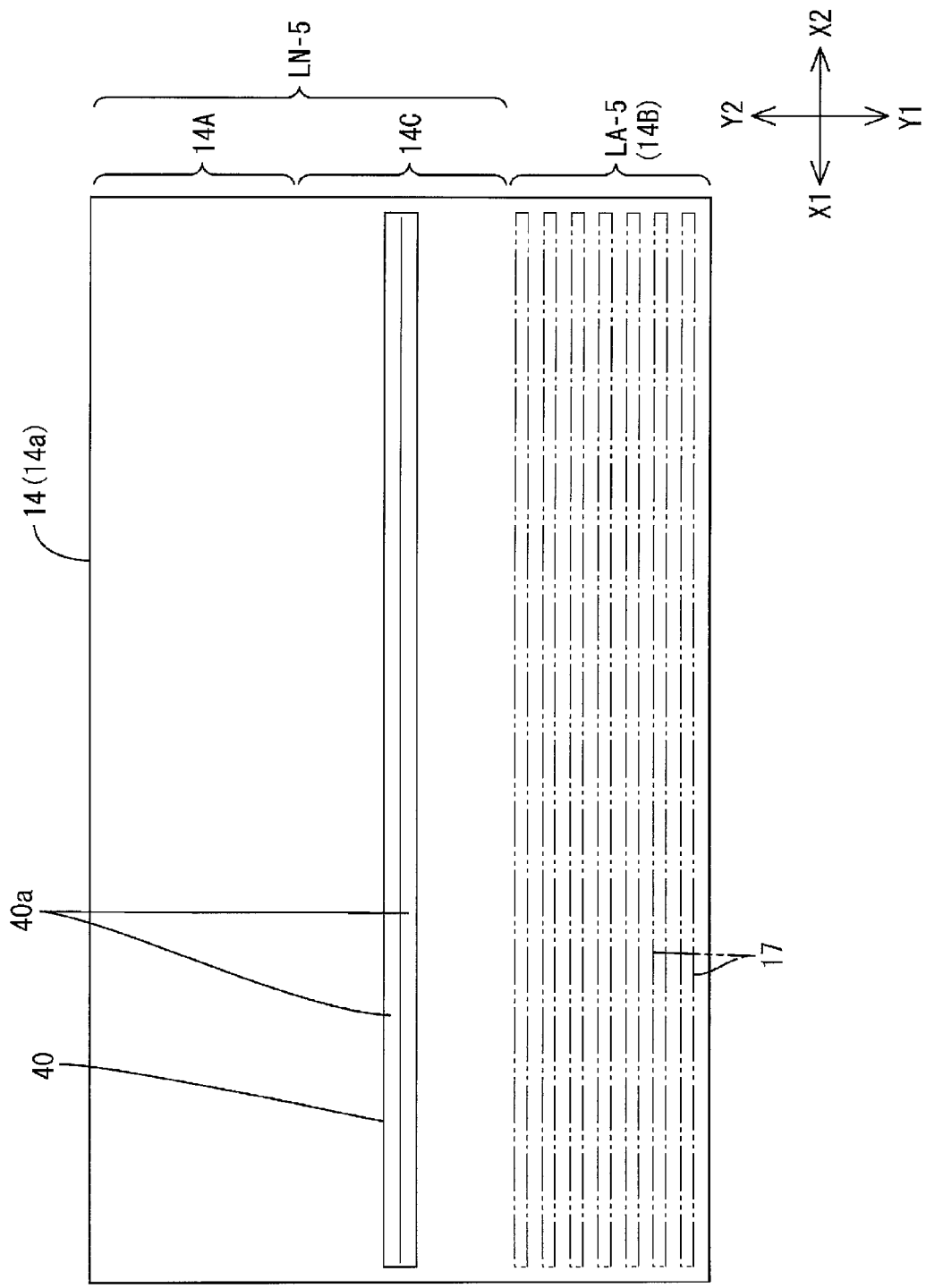
FIG. 31 is a plan view illustrating an arrangement of cold cathode tubes and a chassis provided in a backlight device according to a fifth modification of the second embodiment.
Figure 32:
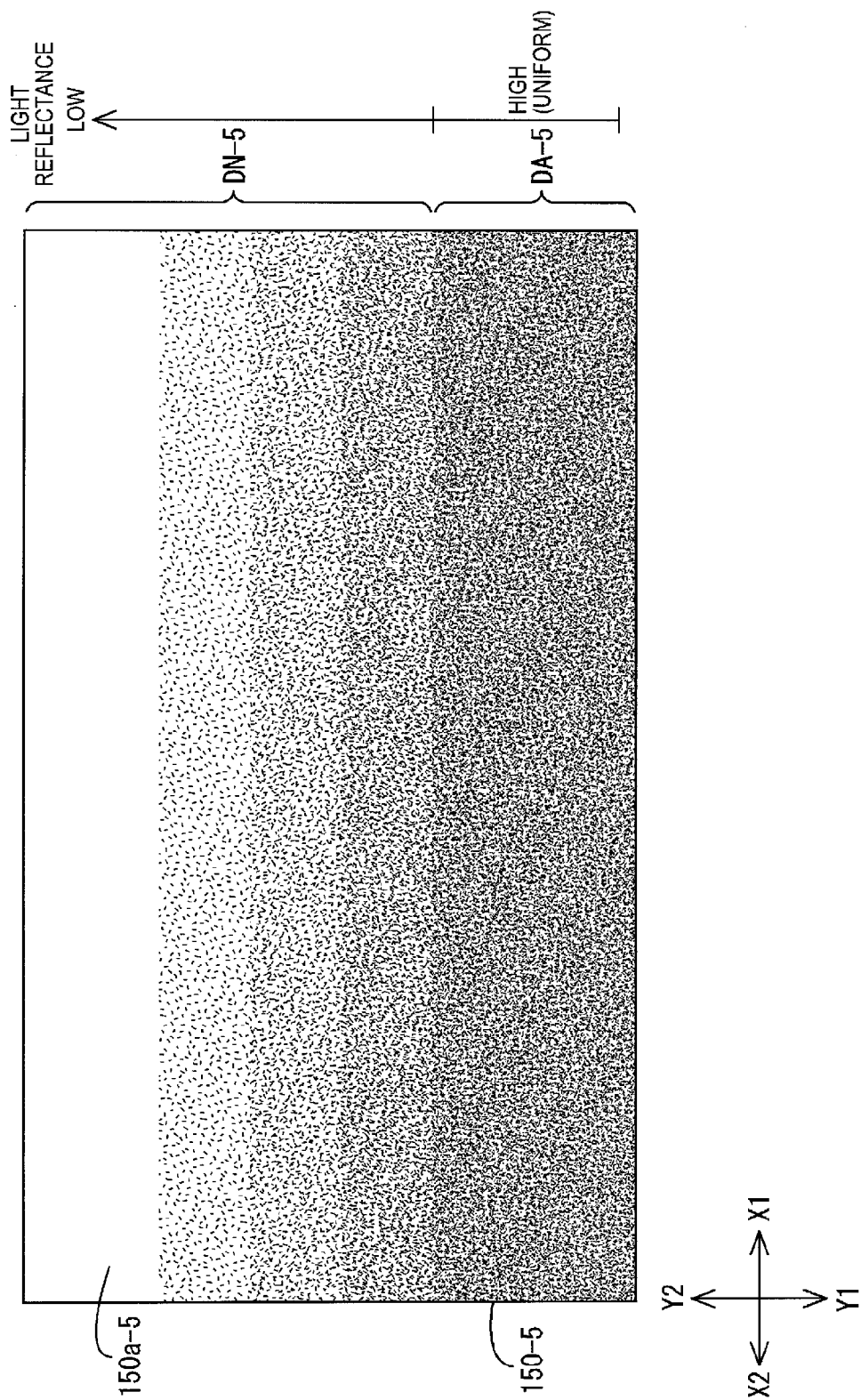
FIG. 32 is a plan view illustrating a light reflectance distribution on a surface of the diffuser plate in FIG. 31.
Figure 33:
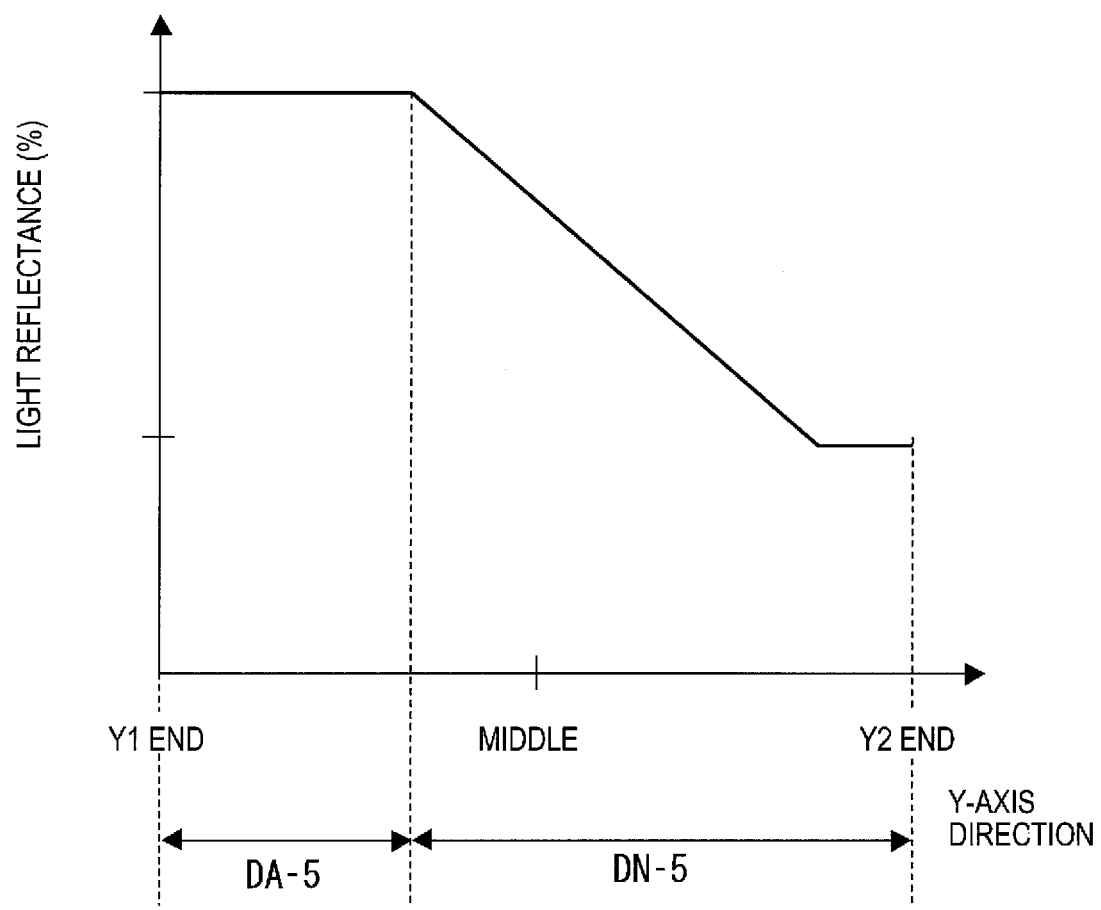
FIG. 33 is a graph illustrating a light reflectance change in the short-side direction of the diffuser plate in FIG. 32.

Next, a fifth modification of the backlight device 12 according to the second embodiment will be explained with reference to FIGS. 31 to 33. In the fifth modification, the arrangement of the cold cathode tubes 17 and the distribution of the light reflectance of a diffuser plate 150-5 are further modified. FIG. 31 is a plan view illustrating a general construction of a chassis according to the fifth modification. FIG. 32 is a plan view illustrating light reflectance of a surface of the diffuser plate. FIG. 33 is a graph illustrating a reflectivity change in the short-side direction of the diffuser plate.

The cold cathode tubes 17 that are housed in a portion within the chassis 14 are arranged as follows. As illustrated in FIG. 31, a bottom plate 14a of the chassis 14 (a portion facing a diffuser plate 150-5) is defined in the short-side direction in a first end portion 14A, a second end portion 14B that is located at an end opposite from the first end portion 14A and a middle portion 14C that is sandwiched between the first end portion 14A and the second end portion 14B. The cold cathode tubes 17 are arranged in the second end portion 14A of the bottom plate 14a and a light source installation area LA-5 is formed in the second end portion 14B. On the other hand, no cold cathode tube 17 is arranged in the first end portion 14A and the middle portion 14C of the bottom plate 14a and an empty area LN-5 is formed there. Namely, the cold cathode tubes 17 are arranged at one end of the bottom plate 14a of the chassis 14 (the end closer to Y1) to form a light source installation area LA-5.

The light reflectance of a first surface 150a-5 of the diffuser plate 150-5 facing the cold cathode tubes 17 change in the short-side direction of the diffuser plate 150-5 as illustrated in FIGS. 32 and 33. Namely, on the surface of the diffuser plate 150-5 facing the cold cathode tubes 17, the light reflectance of the portion that overlaps the light source installation area LA-5 (referred to as the light source overlapped portion DA-5 hereinafter) is higher than the light reflectance of the portion that overlaps the empty area LN-5 (referred to as the empty area overlapping surface area DN-5). More specifically, the light reflectance is 50% and uniform in the light source overlapping surface area DA-5 of the diffuser plate 150-5 (one end of the diffuser plate 150-5 in the short-side direction, the Y1 end in FIG. 33) and it is a maximum value in the diffuser plate 150-5. On the other hand, in the empty area overlapping surface area DN-5 of the diffuser plate 150-5, the light reflectance decreases in a continuous and gradual manner from the portion closer to the light source overlapping surface area DA-5 to the portion away therefrom. The light reflectance is 30% that is a minimum value at the other end of the diffuser plate 150-5 (the Y2 end in FIG. 33) in the short-side direction.

As is explained above, according to the present embodiment, the light source installation area LA-5 is provided in the second end portion 14B of the bottom plate 14a, and the light reflectance of the portion of the diffuser plate 150-5 that overlaps the light source installation area LA-5 (light source overlapping surface area DA-5) is higher than the light reflectance of the portion that overlaps the empty area LN-5 (empty area overlapping surface area DN-5).

According to such a configuration, light emitted from the light source installation area LA-5 first reaches the light source overlapping surface area DA-5 of the diffuser plate 150-5 that has relatively high light reflectance and most of the light is reflected by the light source overlapping surface area DA-5. The reflected light is further reflected by the reflecting sheet 23 or the like in the chassis 14 and reaches the empty area overlapping surface area DN-5. The light reflectance of the empty area overlapping surface area DN-5 is relatively low, and therefore a larger amount of light passes therethrough and predetermined brightness of the illumination light can be obtained. As a result, the backlight device 12 can achieve uniformity of the illumination brightness. This configuration is especially effective for the backlight device 12 where high brightness is required only at one end of the backlight device 12.

Other Embodiments

The embodiments of the present invention have been described, however, the present invention is not limited to the above embodiments explained in the above description and the drawings. The following embodiments may be included in the technical scope of the present invention, for example.

(1) In the above embodiments, the scattering structure is formed over an entire surface of the diffuser plate. However, the scattering structure may be formed partially in a surface of the diffuser plate. For example, the scattering structure may not be formed in a surface area that does not originally cause viewing angle dependency or a surface area that is not related to display. A surface area where the scattering structure is formed may be altered if necessary.

(2) In the above embodiments, the distribution density of the convex portions (the recesses) of the scattering structure in the surface of the diffuser plate is substantially uniform. However, the distribution density of the convex portions (the recesses) may be varied in a surface of the diffuser plate. For example, if the distribution of the amount of rays of light exiting from the second surface of the diffuser plate is uneven in its surface, the distribution density of the convex portions (the recesses) is relatively increased in an area having a relatively great amount of rays of exiting light and the distribution density of the convex portions (the recesses) is relatively lowered in an area having a relatively small amount of rays of exiting light. Accordingly, the scattering degree of light is increased to lower brightness in the area having a great amount of rays of exiting light, and the scattering degree of light is lowered to improve brightness in the area having a small amount of rays of exiting light. This achieves uniform brightness.

(3) In addition to the examples described in the embodiments, the numeric value range of the surface roughness of the scattering structure may be altered if necessary. The numeric value range of the surface roughness of the scattering structure may be altered appropriately according to properties of other components (such as brightness of the cold cathode tubes) or an arrangement of other components (such as a distance between the cold cathode tubes and the diffuser plate, a distance between the cold cathode tubes and the chassis, and a distance the adjacent cold cathode tubes).

(4) In addition to the examples described in the above embodiments, specific methods of forming the scattering structure may be altered if necessary. For example, a corrugated pattern may be formed on a surface of a metal mold that is used for molding a diffuser plate with resin and the corrugated pattern may be transferred to the diffuser plate in molding with resin to form the scattering structure.

(5) In addition to the example described in (4), blasting may be executed to a surface of a diffuser plate to form the scattering structure.

(6) In addition to the examples described in (4) and (5), the scattering structure may be formed by rubbing a surface of the diffuser plate with abrasive or by causing chemical corrosion on the surface of the diffuser plate with medical agent.

(7) In the above embodiments, the scattering structure is formed directly on the surface of the diffuser plate. However, for example, the scattering structure may be formed on a surface of a thin film sheet that is separately provided from the diffuser plate and the sheet may be adhered to the diffuser plate to form the scattering structure integrally with the diffuser plate.

(8) In the first modification of the first embodiment, the second scattering structure formed on the first surface of the diffuser plate is provided over an entire surface of the diffuser plate. However, for example, the second scattering structure may be formed on only areas that do not overlap the light reflecting portions. Additionally, the second scattering structure may be formed on only areas that overlap the light reflecting portions. Further, the second scattering structure may be formed partially in a surface of the diffuser plate with being formed over an area that overlaps the light reflecting portions and an area that does not overlaps the light reflecting portions.

(9) In the above embodiments, each dot of the dot pattern forming the light reflecting portions is formed in a circular shape. However, the shape of each dot is not limited thereto but may be any shape such as a square or a polygonal shape.

(10) In the above embodiments, the light reflecting portions are formed on the surface of the diffuser plate by printing. However, the light reflecting portions may be formed on the surface of the diffuser plate with different methods such as metal evaporation.

(11) In the above embodiments, the light reflecting portions are formed on the surface of the diffuser plate to control light reflectance in the surface of the diffuser plate. However, the light reflectance of the diffuser plate may be controlled as described below. The diffuser plate is generally configured by a translucent base plate with light scattering particles being dispersed therein. The light reflectance of the diffuser plate itself is determined by a ratio (% by weight) of the light scattering particles in the translucent base plate. Namely, the light reflectance is relatively increased by relatively increasing the ratio of the light scattering particles and the light reflectance is relatively decreased by relatively decreasing the ratio of the light scattering particles.

(12) In the above embodiments, the light reflectance of the light guide plate is designed and controlled by changing an area of the dots forming the light reflecting portions. However, as means for controlling the light reflectance, a distance between dots each having a same area may be changed or dots having different light reflectance may be formed.

(13) In the second embodiment, the light source installation area is provided at the center or at the ends of the bottom plate of the chassis. However, for example, the light source installation area may be provided at the center and at one end of the bottom plate. Thus, the present invention includes a configuration in that the position of the light source installation area is changed according to the light amount from the cold cathode tubes or conditions of use for the backlight device.

(14) In the above embodiments, a certain gap is formed between the liquid crystal panel and the diffuser plate. However, the device can be designed such that the gap is substantially zero.

(15) In the above embodiments, the cold cathode tubes are arranged to be parallel to each other in the chassis at equal arrangement intervals. However, the arrangement intervals between the cold cathode tubes may change and the cold cathode tubes may be arranged at irregular arrangement intervals. Specifically, the arrangement interval may be reduced as is closer to a middle portion on a screen of the liquid crystal display device and may be increased as is closer to ends on the screen.

(16) In the above embodiments, the cold cathode tubes that are one example of fluorescent tubes are used as the light source. However, other kinds of fluorescent tubes such as hot cathode tubes may be used as the light source. Discharge tubes (such as mercury lamps) may be used as the light source.

(17) In the above embodiments, the cold cathode tubes (fluorescent tubes) that are one example of a linear light source are used as a light source. However, point light sources such as LEDs (light emitting diodes) may be used as a light source. A planer light source such as an organic EL may be used as a light source.

(18) In the above embodiments, TFTs are used as switching components of the liquid crystal display device. However, the technology described the above can be applied to liquid crystal display devices including switching components other than TFTs (e.g., thin film diode (TFD)). Moreover, the technology can be applied to not only color liquid crystal display devices but also black-and-white liquid crystal display devices.

(19) In the above embodiments, the liquid crystal display device including the liquid crystal panel as a display component is used in the above embodiment. The technology can be applied to display devices including other types of display components.

(20) In the above embodiments, the television receiver including the tuner is used. However, the technology can be applied to a display device without a tuner.

The invention claimed is:

1. A lighting device, comprising:
   a light source;
   a chassis configured to house the light source therein and having an opening through which light emitted from the light source exits;
   an optical member provided so as to face the light source and cover the opening and having a surface including surface areas;
   a light reflecting portion provided on a side of the optical member close to the light source and configured to have different light reflectance in each of the surface areas; and
   a scattering structure formed on a side of the optical member opposite from the light source and configured to scatter the light; wherein
   the chassis has a surface facing the optical member and the surface including at least a first end portion, a second end portion, and a middle portion, the second end portion being located at an end away from the first end portion, and the middle portion being located between the first end portion and the second end portion;
   one or two of the first end portion, the second end portion and the middle portion are configured as light source installation areas in each of which the light source is arranged, and the rest is configured as an empty area in which no light source is arranged;
   the light reflecting portion is formed such that a portion of the optical member that overlaps the light source installation area has a light reflectance higher than a portion of the optical member that overlaps the empty area; and
   the light reflecting portion has a uniform light reflectance in a portion that overlaps the light source installation area.

2. The lighting device according to claim 1, wherein the light reflecting portion is formed such that the light reflectance of a portion of the optical member that overlaps the empty area decreases in a continuous and gradual manner from a side close to the portion that overlaps the light source installation area to the side away therefrom.

3. A lighting device, comprising:
   a light source;
   a chassis configured to house the light source therein and having an opening through which light emitted from the light source exits;
   an optical member provided so as to face the light source and cover the opening and having a surface including surface areas;
   a light reflecting portion provided on a side of the optical member close to the light source and configured to have different light reflectance in each of the surface areas; and
   a scattering structure formed on a side of the optical member opposite from the light source and configured to scatter the light; wherein
   the chassis has a surface facing the optical member and the surface including at least a first end portion, a second end portion, and a middle portion, the second end portion being located at an end away from the first end portion, and the middle portion being located between the first end portion and the second end portion;
   one or two of the first end portion, the second end portion and the middle portion are configured as light source installation areas in each of which the light source is arranged, and the rest is configured as an empty area in which no light source is arranged;
   the light reflecting portion is formed such that a portion of the optical member that overlaps the light source installation area has a light reflectance higher than a portion of the optical member that overlaps the empty area; and
   the light reflecting portion is formed such that the light reflectance of a portion of the optical member that overlaps the empty area decreases in a stepwise manner from a side close to the portion that overlaps the light source installation area to the side away therefrom.

4. The lighting device according to claim 3, wherein the light source installation area of the chassis is smaller than the empty area.

5. The lighting device according to claim 3, wherein the light source installation area is provided in the middle portion of the chassis.

6. The lighting device according to claim 3, wherein the light source installation area is provided in one of the first end portion and the second end portion.

7. The lighting device according to claim 3, wherein the light source installation area is provided in each of the first end portion and the second end portion.

8. The lighting device according to claim 3, wherein the light reflecting portion is formed such that the light reflectance of a portion of the optical member that overlaps the empty area is higher on a side close to the portion that overlaps the light source installation area than on a side away therefrom.

9. The lighting device according to claim 3, wherein the light reflecting portion is configured by a dot pattern having light reflectivity.

10. The lighting device according to claim 3, wherein the light reflecting portion has a uniform light reflectance in a portion that overlaps the light source installation area.

11. The lighting device according to claim 3, wherein the optical member contains diffuser particles dispersed therein.

12. The lighting device according to claim 11, wherein the light reflecting portion has light reflectance higher than the optical member.

13. A display device comprising:
    the lighting device according to claim 3; and
    a display panel configured to provide display using light from the lighting device for a display device.

14. The display device according to claim 13, wherein the display panel is a liquid crystal display panel using liquid crystal.

15. A television receiver comprising the display device according to claim 13.

* * * * *